United States Patent
Niinomi

(10) Patent No.: US 8,228,799 B2
(45) Date of Patent: Jul. 24, 2012

(54) DATA COMMUNICATION APPARATUS AND COMPUTER PRODUCT

(75) Inventor: Tadafusa Niinomi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 547 days.

(21) Appl. No.: 11/812,658

(22) Filed: Jun. 20, 2007

(65) Prior Publication Data

US 2007/0297453 A1    Dec. 27, 2007

(30) Foreign Application Priority Data

Jun. 23, 2006    (JP) ................................. 2006-174106

(51) Int. Cl.
H04L 12/26    (2006.01)
(52) U.S. Cl. ..................................................... 370/235
(58) Field of Classification Search .......... 370/235–240, 370/351, 389, 412–421; 714/100, 1, 2, 15, 714/18, 699, 746, 748–751
See application file for complete search history.

(56) References Cited

U.S. PATENT DOCUMENTS

| | | | | |
|---|---|---|---|---|
| 6,338,090 B1* | 1/2002 | Emmes et al. | ................ | 709/234 |
| 6,694,386 B1 | 2/2004 | Arase et al. | | |
| 7,111,092 B1* | 9/2006 | Mitten et al. | .................... | 710/52 |
| 2002/0154600 A1* | 10/2002 | Ido et al. | ........................ | 370/216 |
| 2004/0165543 A1* | 8/2004 | Nakazawa | ..................... | 370/252 |
| 2005/0135412 A1* | 6/2005 | Fan | ................................ | 370/463 |
| 2006/0209837 A1* | 9/2006 | Lee et al. | ....................... | 370/394 |
| 2006/0221875 A1* | 10/2006 | Trainin | ......................... | 370/282 |
| 2006/0262738 A1* | 11/2006 | Fernandes et al. | ............ | 370/282 |
| 2007/0061492 A1* | 3/2007 | van Riel | ............................ | 710/3 |

FOREIGN PATENT DOCUMENTS

JP    2001-144829    5/2001
JP    2004-274376    9/2004

OTHER PUBLICATIONS

Japanese Office Action issued Feb. 22, 2011 in corresponding Japanese Patent Application 2006-174106.

* cited by examiner

*Primary Examiner* — Hassan Kizou
*Assistant Examiner* — Charles C Jiang
(74) *Attorney, Agent, or Firm* — Staas & Halsey LLP

(57) ABSTRACT

A host computer in a communication system measures a round trip time (RTT) returned from a destination terminal when a connection is established on a virtual communication path on a network interface card (NIC) for each connection. When the RTT is larger than a predetermined threshold, the host computer starts storing transmission data in a retransfer buffer in an OS of the host computer, and transfers the transmission data to the NIC. When the RTT is smaller than the predetermined threshold, the host computer starts transferring the transmission data to the NIC and stores the transferred transmission data in a retransfer buffer in the NIC.

17 Claims, 15 Drawing Sheets

FIG.3

| CONNECTION | RTT |
|---|---|
| ⋮ | ⋮ |
| A | 1 ms |
| B | 200 ms |
| C | 30 ms |
| D | 200 ms |

FIG.4

| CONNECTION | IS RTT LARGER THAN THRESHOLD? |
|---|---|
| ⋮ | ⋮ |
| A | LARGER (NORMAL COMMUNICATION) |
| B | NOT LARGER (ZERO-COPY COMMUNICATION) |
| C | LARGER (NORMAL COMMUNICATION) |
| D | NOT LARGER (ZERO-COPY COMMUNICATION) |

| CASE | BANDWIDTH/ CONNECTION | RTT | BT PRODUCT/ CONNECTION | BT PRODUCT/ TOTAL CONNECTION | SET TO ZERO-COPY COMMUNICATION TARGET? |
|------|----------------------|--------|-----------------------|------------------------------|----------------------------------------|
| A | 10 Gbps | 1 ms | 1 MB | 1 MB | YES |
| B | 10 Gbps | 200 ms | 200 MB | 200 MB | NO |
| C | 100 Mbps | 1 ms | 10 KB | 1 MB | YES |
| D | 100 Mbps | 200 ms | 2 MB | 200 MB | YES WHENEVER POSSIBLE |

# DATA COMMUNICATION APPARATUS AND COMPUTER PRODUCT

BACKGROUND OF THE INVENTION

1. Field of the Invention

The present invention relates to a technology for transferring data stored in a retransfer buffer provided in a communication system to a communication-destination terminal.

2. Description of the Related Art

In a communication system, a method for assuring reliability for performing communication between computer terminals has been proposed. In the method, there is a technology for retransferring data that has been transmitted between computer terminals when a communication failed or there is a possibility of a communication failure in the computer system. In the technology, it is required to provide a retransfer buffer that stores therein transmission data that has been transmitted to a receiving side and that is to be retransferred to the receiving side, if necessary, due to an occurrence of a failure.

In a communication system employing Socket-application program interface (API) or transmission control protocol/Internet protocol (TCP/IP) that are widely used for a communication between computer terminals, a retransfer buffer is generally provided in an operating system (OS) of a host computer. For example, retransfer data is copied in the retransfer buffer and the retransfer data is to be retransferred when a retransfer is required due to an absence of a communication acknowledgement.

Alternatively, in a copy offload engine (COE) method, a zero-copy communication that reduces an operation for copying transmission data is performed in the OS. In the zero-copy communication, the retransfer buffer is provided in a memory inside a network interface card (NIC). For example, a technology for providing a retransfer buffer in the memory inside the NIC (hereinafter, "NIC memory") is disclosed in Japanese Patent Application Laid-Open No. 2004-274376. In the above technology, the transmission data is directly transferred to the NIC memory without being copied in a memory in the OS, and retransferred from the NIC memory when a retransfer is required. In a TCP/IP offload engine (TOE) method, it is also possible to use the NIC memory as a retransfer buffer.

However, in the communication method in which a retransfer buffer is provided in the OS of a host computer, since transmission data is copied to the retransfer buffer in the OS and then transferred to a NIC, it is difficult to increase a communication speed due to a load of copying data to a retransfer buffer.

If the retransfer buffer is provided in a NIC memory, a large capacity of the NIC memory is needed depending on a communication-destination terminal. Therefore, it is difficult to reduce a cost of the NIC.

SUMMARY OF THE INVENTION

It is an object of the present invention to at least partially solve the problems in the conventional technology.

A computer-readable recording medium according to one aspect of the present invention stores therein a computer program for transferring transmission data from a host memory that includes a first retransfer buffer for storing therein the transmission data to a network hardware that includes a second retransfer buffer for storing therein the transmission data and transmitting the transmission data to a destination terminal via a connection that is a virtual communication path established on either one of the host computer and the network hardware. The computer program causes a computer to execute measuring a response time from the destination terminal for each connection; determining whether measured response time is larger than a first delay threshold; and storing, when it is determined that the measured response time is larger than the first delay threshold, the transmission data in the first retransfer buffer, and when it is determined that the measured response time is smaller than the first delay threshold, the transmission data in the second retransfer buffer.

An apparatus according to another aspect of the present invention is for transferring transmission data from a host memory that includes a first retransfer buffer for storing therein the transmission data to a network hardware that includes a second retransfer buffer for storing therein the transmission data and transmitting the transmission data to a destination terminal via a connection that is a virtual communication path established on either one of the host computer and the network hardware. The apparatus includes a measuring unit that measures a response time from the destination terminal for each connection; a determining unit that determines whether measured response time is larger than a first delay threshold; and a storing unit that stores, when it is determined that the measured response time is larger than the first delay threshold, the transmission data in the first retransfer buffer, and when it is determined that the measured response time is smaller than the first delay threshold, the transmission data in the second retransfer buffer.

A method according to still another aspect of the present invention is for transferring transmission data from a host memory that includes a first retransfer buffer for storing therein the transmission data to a network hardware that includes a second retransfer buffer for storing therein the transmission data and transmitting the transmission data to a destination terminal via a connection that is a virtual communication path established on either one of the host computer and the network hardware. The method includes measuring a response time from the destination terminal for each connection; determining whether measured response time is larger than a first delay threshold; and storing, when it is determined that the measured response time is larger than the first delay threshold, the transmission data in the first retransfer buffer, and when it is determined that the measured response time is smaller than the first delay threshold, the transmission data in the second retransfer buffer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an example of a measured round trip time (RTT) stored in an RTT memory unit shown in FIG. 2;

FIG. 4 is an example of contents of a determination result stored in a connection memory unit shown in FIG. 2;

DETAILED DESCRIPTION OF THE PREFERRED EMBODIMENTS

Exemplary embodiments of the present invention are explained in detail below with reference to the accompanying drawings. The present invention is not limited to the embodiments.

Figure 1A:
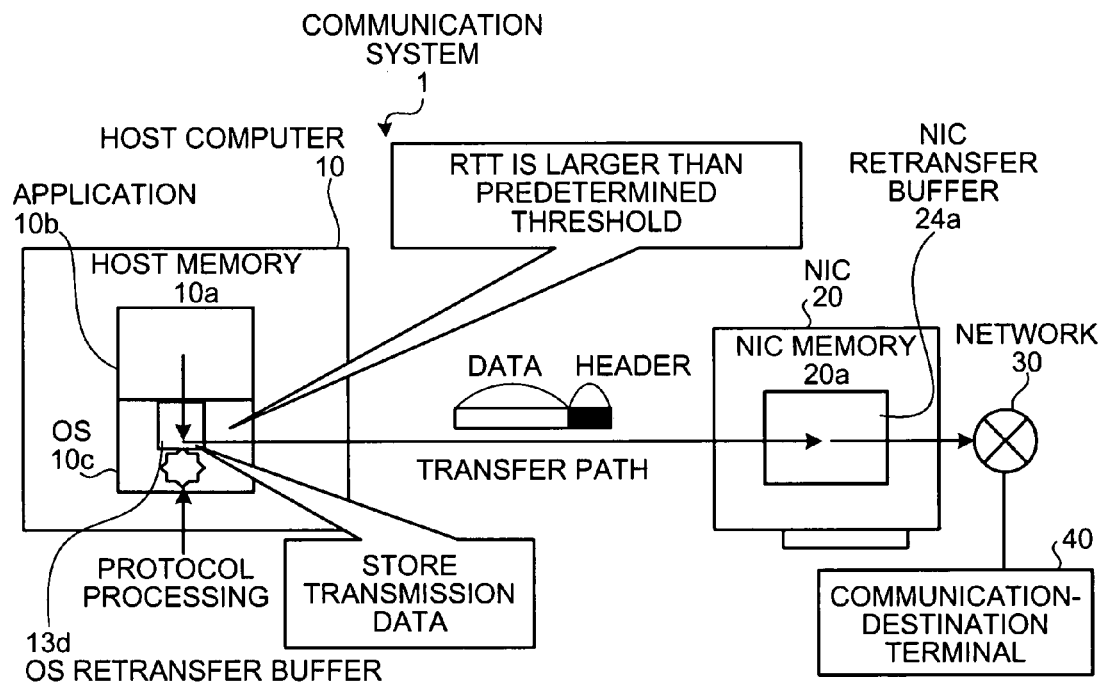
FIGS. 1A and 1B are schematic diagrams for explaining a concept of a communication system according to a first embodiment of the present invention.
Figure 1B:
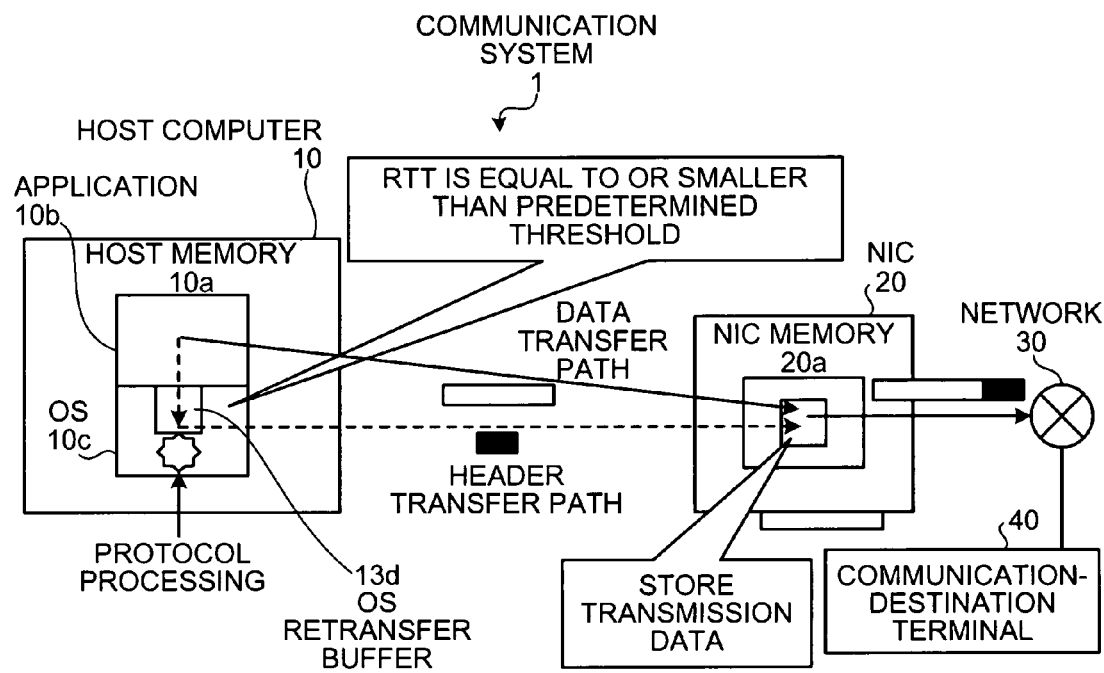

FIGS. 1A and 1B are schematic diagrams for explaining a concept of a communication system 1 according to a first embodiment of the present invention. In the first embodiment, it is assumed that a TCP/IP communication is employed, with which a receiving side returns a reception acknowledgement to a transmitting side upon reception of a packet, while the transmitting side opens data area corresponding to the reception acknowledgement in a retransfer buffer area upon reception of the reception acknowledgement.

In the communication system 1, transmission data is transferred from a host computer 10 to a network interface card (NIC) 20. The host computer includes an OS retransfer buffer 13d that stores therein the transmission data while the NIC 20 includes an NIC retransfer buffer 24a that stores therein the same transmission data. Thereafter, the transmission data is transmitted to a communication-destination terminal 40 through a connection that is a virtual transfer path established either on the host computer 10 or on the NIC 20. In the communication system 1, it is possible to increase a communication speed while suppressing a memory usage in the NIC 20.

As shown in FIG. 1, the communication system 1 includes the host computer 10 and the NIC 20. The host computer 10 includes a host memory 10a that stores therein an application 10b and an operating system (OS) 10c, and the OS 10c contains the OS retransfer buffer 13d that stores therein transmission data to be retransferred. The NIC 20 includes an NIC memory 20a that contains the NIC retransfer buffer 24a that stores therein transmission data to be retransferred.

When a virtual communication path is established (hereinafter, "connection is established") either on the host computer 10 or on the NIC 20, the host computer 10 in the communication system 1 measures round trip time (RTT) that is a response time between the communication-destination terminals 40, with respect to each connection. Specifically, when an application program interface (API) of the application 10b instructs the OS 10c to establish a connection before starting a communication, the host computer 10 measures the RTT at a timing of the establishment of each connection.

Thereafter, the host computer 10 determines whether a measured RTT is larger than a predetermined threshold. As a result of measurement, if it is determined that the RTT is larger than the predetermined threshold, the host computer 10 starts storing transmission data to the OS retransfer buffer 13d in the host computer 10, and starts transferring the transmission data to the NIC 20 (see FIG. 1A). Specifically, upon determining that the RTT is larger than the predetermined threshold, the host computer 10 copies retransmission data by a processor from a memory area in the application 10b to the OS retransfer buffer 13d. Thereafter, the host computer 10 packetizes the retransmission data by a TCP/IP protocol stack inside the OS 10c, and starts transferring packet data to the NIC 20. The NIC 20 starts transmitting the packet data to the communication-destination terminal 40 via a network 30. It is assumed here that above described operation in which the transmission data is stored in the OS retransfer buffer 13d and the transmission data is transferred to the NIC 20 at the same time is called "normal communication".

On the other hand, if it is determined that the RTT is equal to or smaller than the predetermined threshold, the host computer 10 starts transferring the transmission data to the NIC 20 and starts storing the transferred transmission data in the NIC retransfer buffer 24a inside the NIC 20 (see FIG. 1B). Specifically, upon determining that the RTT is equal to or smaller than the predetermined threshold, the host computer 10 transfers the transmission data from the memory area in the application 10b to the NIC retransfer buffer 24a inside the NIC 20, by the OS 10c using direct access memory (DMA) transfer. Thereafter, the OS 10c creates a packet header corresponding to DMA-transfer data and starts transferring the DMA-transfer data. The NIC 20 creates a packet by combining the DMA-transfer data and the packet header and starts transmitting created packet to the communication-destination terminal 40 via the network 30. It is assumed that above described operation, in which the transmission data is transferred to the NIC 20 and the transmission data is stored in the NIC retransfer buffer 24a, is called "zero-copy communication".

As described above, the communication system 1 stores transmission data with a small RTT in the NIC retransfer buffer 24a and omits a data-copy operation performed by the OS 10c, while storing in the host memory transmission data that requires large usage of the NIC retransfer buffer 24a and suppressing memory usage. Accordingly, it is possible to suppress memory usage in the network hardware and to increase a communication speed.

Figure 2:
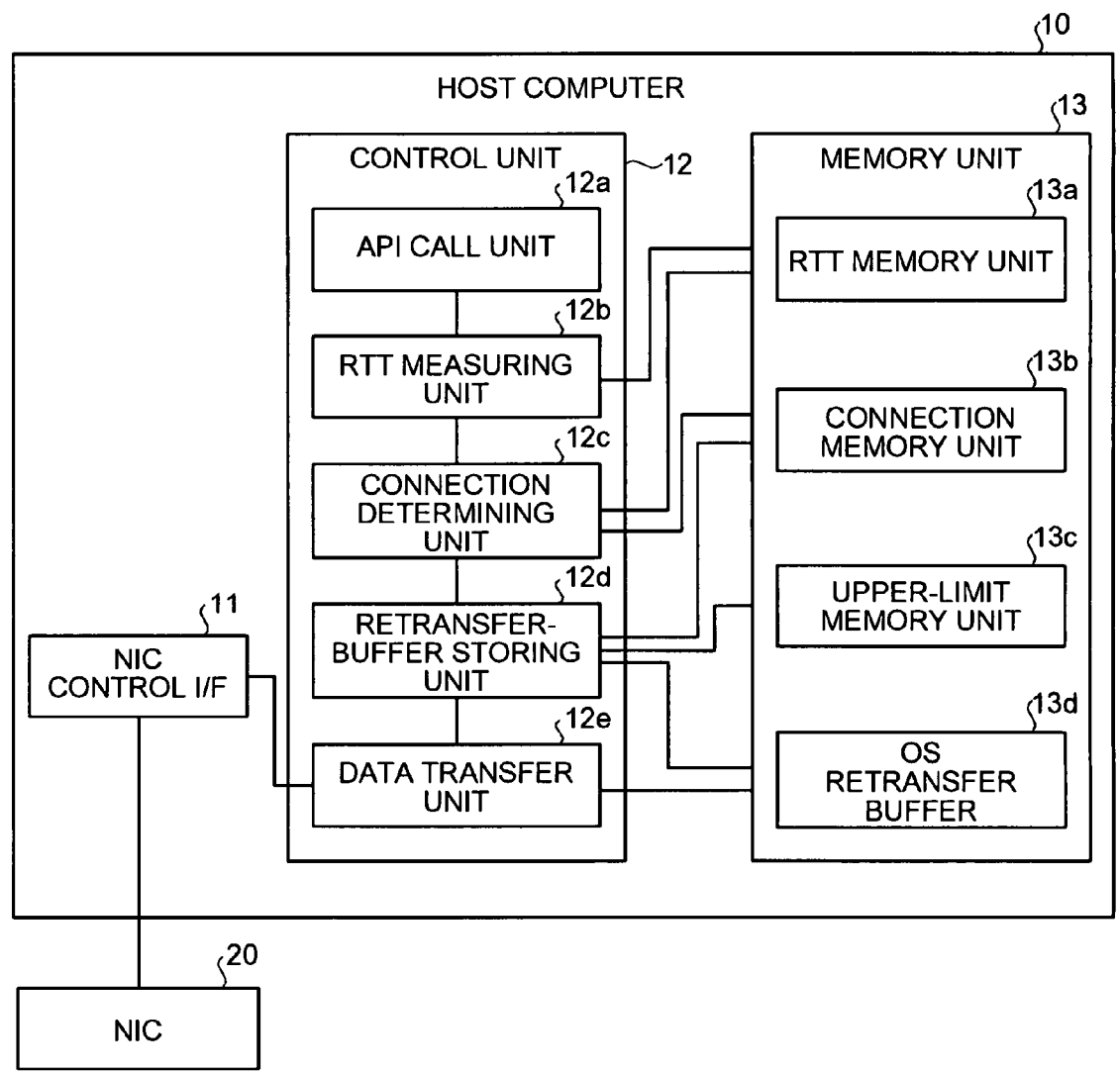
FIG. 2 is a block diagram of a host computer shown in FIG. 1.

FIG. 2 is a block diagram of the host computer 10. The host computer 10 includes a NIC control interface (I/F) 11, a control unit 12, and a memory unit 13, and is connected to the NIC 20.

The NIC control I/F 11 controls communication related to various pieces of information transmitted and received to/from the connected NIC 20. Specifically, the NIC control I/F 11 transfers transmission data to the NIC 20 and receives a reception acknowledgement from the NIC 20.

The memory unit 13 stores therein data and programs necessary for various processes performed by the control unit 12. Specifically, the memory unit 13 includes an RTT memory unit 13a, a connection memory unit 13b, an upper-limit memory unit 13c, and the OS retransfer buffer 13d.

The RTT memory unit 13a stores therein RTTs for each of connections. Specifically, as shown in FIG. 3, the RTT memory unit 13a stores therein RTTs measured by an RTT measuring unit 12b explained later, for each of the connections at the time of the establishment of each connection.

The connection memory unit 13b stores therein a determination result whether the RTT for each connection is larger than a threshold. Specifically, as shown in FIG. 4, the connection memory unit 13b stores therein whether the RTT is larger or not larger than a threshold with respect to each connection. If it is determined that the RTT is larger than the threshold, the normal communication is performed, and if it is determined that the RTT is not larger than the threshold, the zero-copy communication is performed.

The upper-limit memory unit 13c stores therein an upper-limit of data capacity available in the NIC retransfer buffer 24a. Specifically, an upper-limit setting unit (not shown) sets a value that is larger than a value obtained by multiplying a communication speed of the NIC 20 by a threshold of an RTT used by a connection determining unit 12c explained later, and stores therein the set value as an upper-limit of the NIC retransfer buffer 24a.

The OS retransfer buffer 13d stores therein the transmission data. Specifically, if the normal communication is performed, the transmission data is stored in the OS retransfer buffer 13d by a retransfer-buffer storing unit 12d explained later.

The control unit 12 includes an internal memory that stores therein necessary data and programs that specifies various process procedures, and performs various processes using the data and the programs. Specifically, the control unit 12 includes an API call unit 12a, the RTT measuring unit 12b, the connection determining unit 12c, the retransfer-buffer storing unit 12d, and a data transfer unit 12e.

The API call unit 12a calls transmission API and instructs the OS 10c to transmit the transmission data to the communication-destination terminal 40. Specifically, the API call unit 12a instructs the OS 10c to transmit the transmission data to the communication-destination terminal 40 using an API of the application 10b.

The RTT measuring unit 12b measures the RTT that is a response time between the host computer 10 and the communication-destination terminal 40 for each connection. Specifically, when the application 10b instructs the OS 10c to establish a connection before starting a communication, the RTT measuring unit 12b measures the RTT at a timing of the establishment of each connection, and stores a measurement result in the RTT memory unit 13a.

The connection determining unit 12c determines whether the RTT is larger than a predetermined threshold for each connection. Specifically, the connection determining unit 12c reads the RTT for each connection from the RTT memory unit 13a and determines whether read RTT is larger than a predetermined threshold for each connection. As a result of determination, if the RTT is larger than the predetermined threshold, the connection determining unit 12c stores a determination result in the connection memory unit 13b and sets the normal communication for the connection. On the other hand, if the RTT is equal to or smaller than the threshold, the connection determining unit 12c stores determination result in the connection memory unit 13b and sets the zero-copy communication for the connection.

The retransfer-buffer storing unit 12d stores the transmission data in either the OS retransfer buffer 13d or the NIC retransfer buffer 24a. Specifically, when the API call unit 12a calls the transmission API, the retransfer-buffer storing unit 12d reads a determination result from the connection memory unit 13b for each connection. If the RTT for a connection is larger than the threshold, that is, if the zero copy communication cannot be performed in the connection, the retransfer-buffer storing unit 12d starts storing the transmission data in the OS retransfer buffer 13d and instructs the data transfer unit 12e to transfer stored transmission data to the NIC 20.

On the other hand, if the RTT for the connection is equal to or smaller than the threshold, that is, if the zero copy communication can be performed in the connection, the retransfer-buffer storing unit 12d determines whether to perform the zero-copy communication based on a message size and an available memory size. If it is determined to perform the zero-copy communication, the retransfer-buffer storing unit 12d instructs the data transfer unit 12e to start transferring the transmission data to the NIC 20. Alternatively, if it is determined to perform the normal communication, the retransfer-buffer storing unit 12d starts storing the transmission data in the OS retransfer buffer 13d, and instructs the data transfer unit 12e to start transferring the transmission data to the NIC 20.

A process for determining whether to perform the zero-copy communication based on a message size and an available memory size is explained in detail. The retransfer-buffer storing unit 12d measures a message size for a connection which RTT has been determined to be larger than a predetermined RTT threshold, and determines to perform the zero-copy communication when a message size of the transmission data in the connection is larger than a predetermined size. The retransfer-buffer storing unit 12d reads an upper-limit of data capacity available for storing data in the NIC retransfer buffer 24a from the upper-limit memory unit 13c. When the available memory size of the NIC retransfer buffer 24a is equal to or larger than a size obtained by subtracting a size of the NIC retransfer buffer 24a currently being used in the NIC 20 from the upper-limit, the retransfer-buffer storing unit 12d determines to perform the zero-copy communication.

The data transfer unit 12e transfers the transmission data to the NIC 20. Specifically, upon receiving an instruction to start transferring the transmission data to the NIC 20, the data transfer unit 12e transfers the transmission data to the NIC 20.

Figure 5:
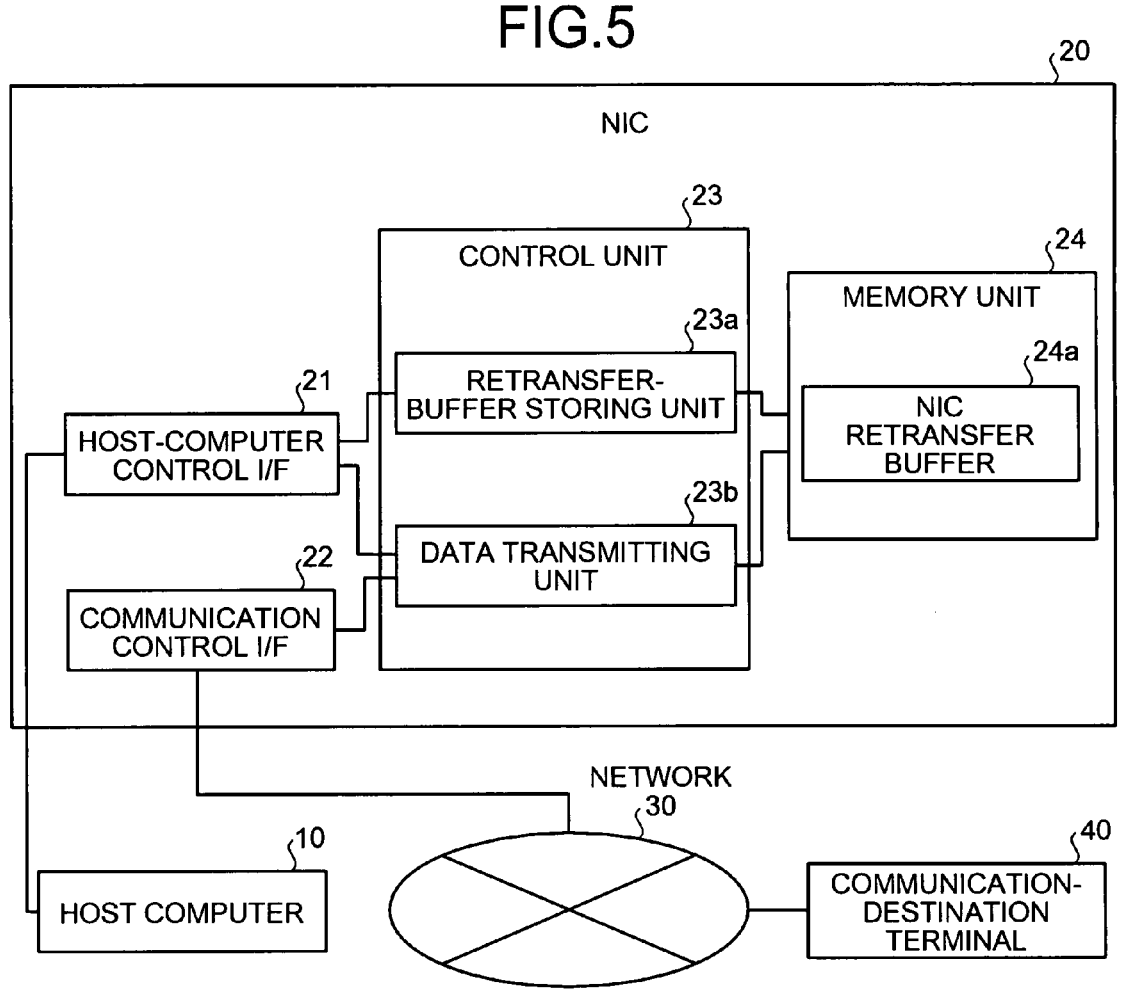
FIG. 5 is a block diagram of a NIC shown in FIG. 1.

A configuration of the NIC 20 is explained with reference to FIG. 5. The NIC 20 includes a host-computer control I/F 21, a communication control I/F 22, a control unit 23, and a memory unit 24, and is connected to the host computer 10 via the network 30.

The host-computer control I/F 21 controls a communication related to various pieces of information transmitted and received to/from the connected host computer 10. Specifically, the host-computer control I/F 21 receives the transmission data from the host computer 10 and transmits a reception acknowledgement to the host computer 10.

The communication control I/F 22 controls communication related to various pieces of information transmitted and received to/from the communication-destination terminal 40 connected to the NIC 20 via the network 30. Specifically, the communication control I/F 22 transmits transmission data to the communication-destination terminal 40 via the network 30.

The memory unit 24 stores therein data and programs necessary for various processes performed by the control unit 23. Specifically, the memory unit 24 includes the NIC retransfer buffer 24a that stores therein the transmission data. Specifically, when the RTT is equal to or smaller than a threshold, a retransfer-buffer storing unit 23a stores the transmission data in the memory unit 24.

The control unit 23 includes an internal memory that stores therein necessary data and programs that specifies various process procedures, and performs various processes using the data and the programs. Specifically, the control unit 23 includes the retransfer-buffer storing unit 23a and a data transmitting unit 23b.

The retransfer-buffer storing unit 23a stores the transmission data in the NIC retransfer buffer 24a. Specifically, if the retransfer-buffer storing unit 12d in the host computer 10 determines that the RTT is equal to or smaller than a predetermined threshold, and upon reception of the transmission data from the host computer 10, the retransfer-buffer storing unit 23a starts storing the transmission data in the NIC retransfer buffer 24a.

The data transmitting unit 23b transmits transmission data. Specifically, the data transmitting unit 23b starts transmitting the transmission data to the communication-destination terminal 40 after the transmission data is stored in the NIC retransfer buffer 24a in the zero-copy communication. In the normal communication, the data transmitting unit 23b starts transmitting the transmission data transferred from the host computer 10, to the communication-destination terminal 40.

Figure 6:
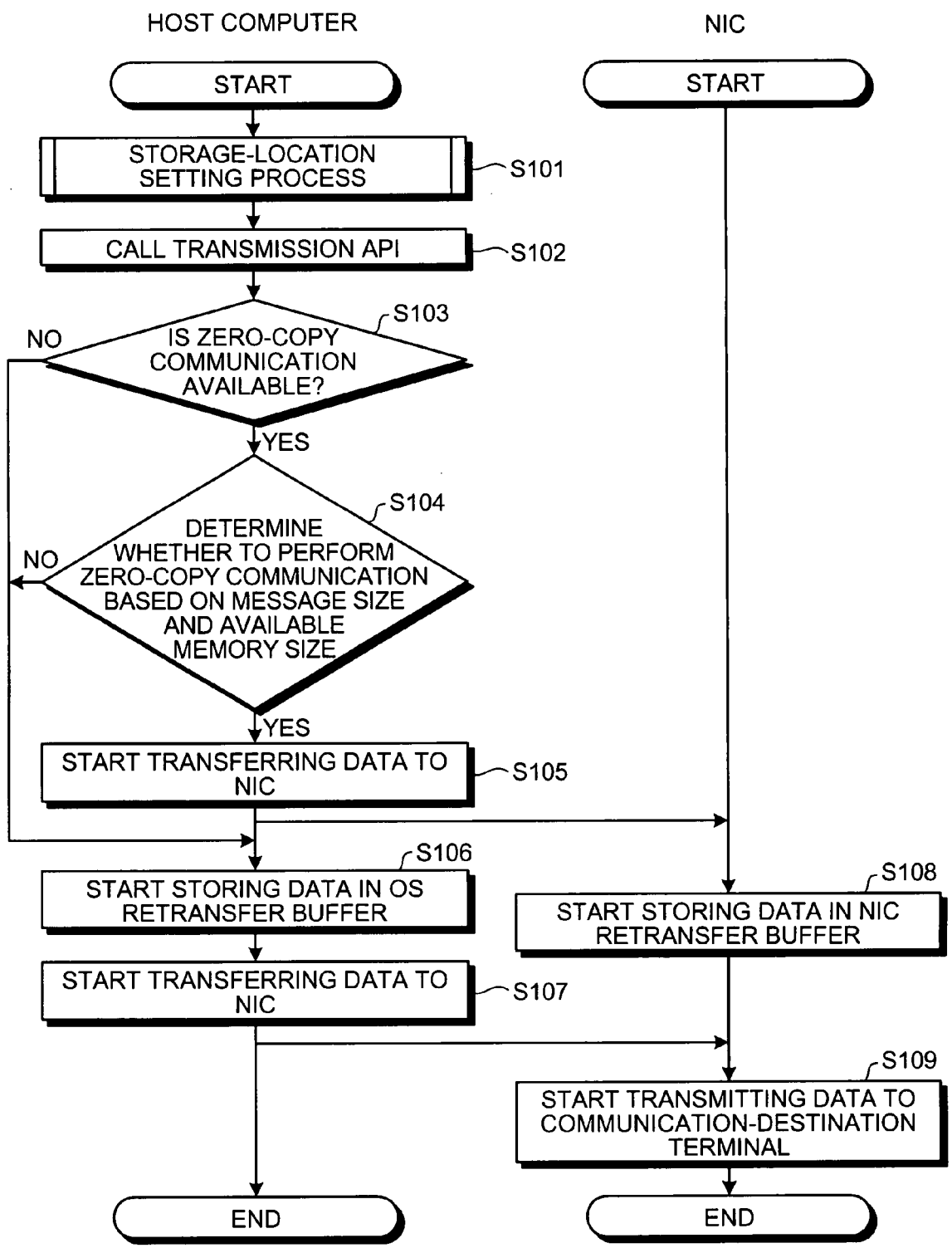
FIG. 6 is a sequence diagram of a communication process performed by the communication system shown in FIG. 1.
Figure 7:
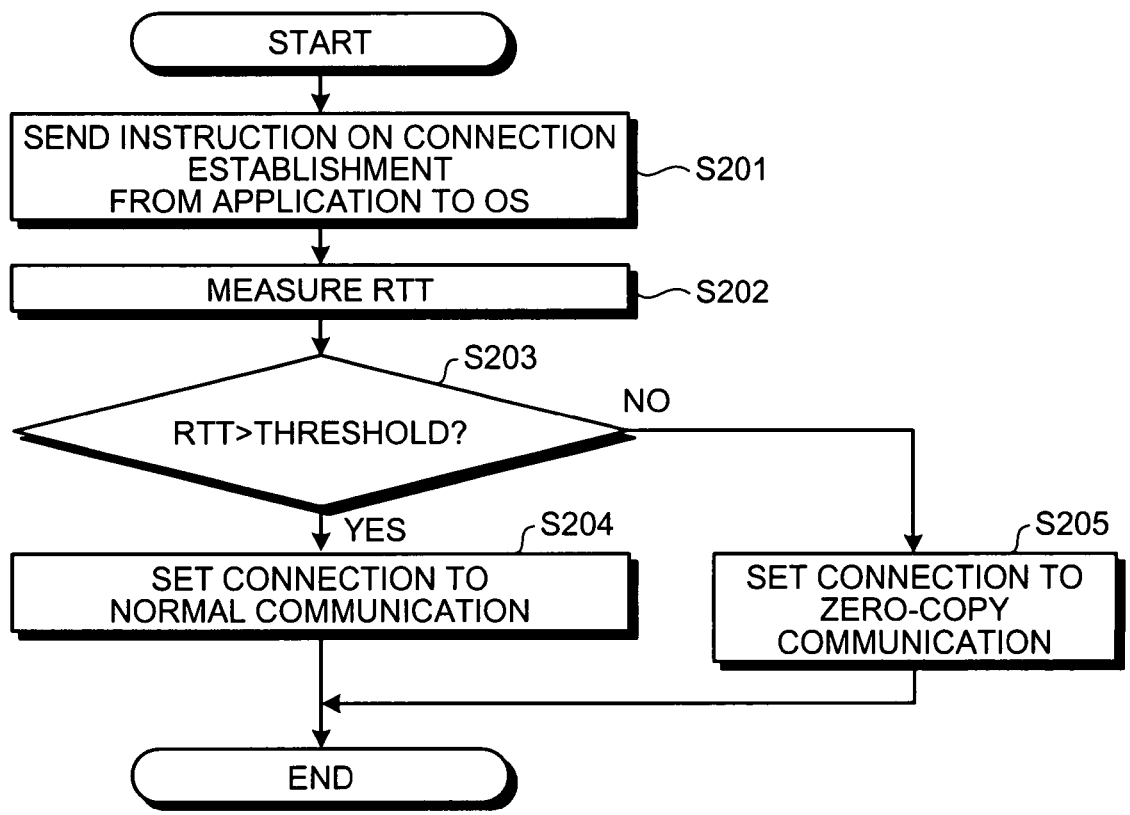
FIG. 7 is a flowchart of a storage-location setting process performed by the host computer shown in FIG. 2.

A communication process performed by the communication system 1 is explained with reference to FIGS. 6 and 7. FIG. 6 is a sequence diagram of the communication process while FIG. 7 is a flowchart of a storage-location setting process in the communication process.

As shown in FIG. 6, when the application 10b instructs the OS 10c to establish a connection before starting a communication, the host computer 10 performs a process for setting a storage location for storing the transmission data for each connection (step S101).

The storage-location setting process is explained in detail with reference to FIG. 7. When the application 10b instructs the OS 10c to establish a connection before starting a communication (step S201), the RTT measuring unit 12b measures the RTT at a timing of the establishment of each connection, and stores a measurement result in the RTT memory unit 13a (step S202). The connection determining unit 12c reads the RTT for each connection from the RTT memory unit 13a and determines whether read RTT is larger than a predetermined threshold (step S203). If the RTT is larger than the predetermined threshold (YES at step S203), the connection determining unit 12c stores a determination result in the connection memory unit 13b, and sets the connection to the normal communication (step S204). On the other hand, if the RTT is equal to or smaller than the predetermined threshold (NO at step S203), the connection determining unit 12c stores a determination result in the connection memory unit 13b and sets the connection to the zero-copy communication (step S205).

Referring back to FIG. 6, when the API call unit 12a calls transmission API (step S102), the retransfer-buffer storing unit 12d reads a determination result for each connection from the connection memory unit 13b, and determines whether the zero copy communication is available (step S103). If the RTT for a connection is larger than the predetermined threshold, that is, if the zero copy communication cannot be performed in the connection (NO at step S103), the retransfer-buffer storing unit 12d starts storing the transmission data in the OS retransfer buffer 13d (step S106). Thereafter, the data transfer unit 12e starts transferring stored transmission data to the NIC 20 (step S107). The data transmitting unit 23b starts transmitting the transmission data to the communication-destination terminal 40 (step S109). Processes for storage, transfer, and transmission are continued until each of the processes is completed.

On the other hand, if the RTT for a connection is equal to or smaller than the predetermined threshold, that is, if the zero copy communication can be performed in the connection (YES at step S103), the retransfer-buffer storing unit 12d determines whether to perform the zero-copy communication based on a message size and an available memory size (step S104). If it is determined to perform the normal communication (NO at step S104), the retransfer-buffer storing unit 12d starts storing the transmission data in the OS retransfer buffer 13d similarly to the above operation (step S106). Thereafter, the data transfer unit 12e starts transferring stored transmission data to the NIC 20 (step S107), and the data transmitting unit 23b starts transmitting the transmission data to the communication-destination terminal 40 (step S109).

On the other hand, if it is determined to perform the zero-copy communication (YES at step S104), the data transfer unit 12e starts transferring the transmission data to the NIC 20 (step S105). The retransfer-buffer storing unit 23a in the NIC 20 receives the transmission data from the host computer 10 and starts storing the transmission data in the NIC retransfer buffer 24a (step S108). Thereafter, the data transmitting unit 23b starts transmitting the transmission data to the communication-destination terminal 40 (step S109). Processes for storage, transfer, and transmission are continued until each of the processes is completed.

As described above, the communication system 1 measures a response time between either the host computer 10 or the NIC 20 and the communication-destination terminal 40 for each connection, and determines whether measured response time is larger than a predetermined RTT threshold. If it is determined that the response time is larger than the predetermined RTT threshold, the communication system 1 stores the transmission data in the OS retransfer buffer 13d in the host memory 10a. Alternatively, if it is determined that the response time is equal to or smaller than the predetermined RTT threshold, the communication system 1 stores the transmission data in the NIC retransfer buffer 24a. Accordingly, in such a connection that requires a long response time, that is, if the communication speed cannot effectively be increased in the connection by storing the transmission data in the NIC retransfer buffer 24a, the transmission data is stored in the OS retransfer buffer 13d to suppress memory usage in network hardware. On the other hand, in such a connection that does not require a long response time, that is, if the communication speed can effectively be increased in the connection by storing the transmission data in the NIC retransfer buffer 24a, the transmission data is stored in the NIC retransfer buffer 24a. Therefore, it is possible to suppress the memory usage in the network hardware and to increase the communication speed.

Furthermore, since the response time is measured at a timing of the establishment of each connection, it is possible to easily and precisely measure the response time, based on data transmission/reception to/from the communication-destination terminal 40 at a timing of handshake.

Moreover, an upper-limit that indicates data capacity available for storing data in the NIC retransfer buffer 24a is set. The transmission data is stored in the NIC retransfer buffer 24a when the available memory size of the NIC retransfer buffer 24a is equal to or larger than a size obtained by subtracting a size of the NIC retransfer buffer 24a currently being used in the NIC 20 from set upper-limit. Therefore, it is possible to arbitrarily set memory usage in the NIC 20.

Furthermore, among the connections that have been determined to require a larger response time than a predetermined RTT threshold, when a connection includes the transmission data which message size is larger than a predetermined size, the transmission data is stored in the NIC retransfer buffer

24a. Accordingly, if the message size of the transmission data is equal to or smaller than a predetermined threshold, that is, when it is difficult to increase a communication speed by storing the transmission data in the NIC retransfer buffer 24a, the transmission data is not stored in the NIC retransfer buffer 24a. On the other hand, if the message size of the transmission data is larger than the predetermined threshold, that is, if the communication speed can effectively be increased by storing the transmission data in the NIC retransfer buffer 24a, the transmission data is stored in the NIC retransfer buffer 24a. Therefore, it is possible to suppress memory usage in the NIC 20.

According to the first embodiment, a storage location for the transmission data is determined based on the RTT when a connection is established. However, the present invention is not thus limited and the storage location for transmission data can be determined based on the RTT obtained after the connection is established.

Figure 8:
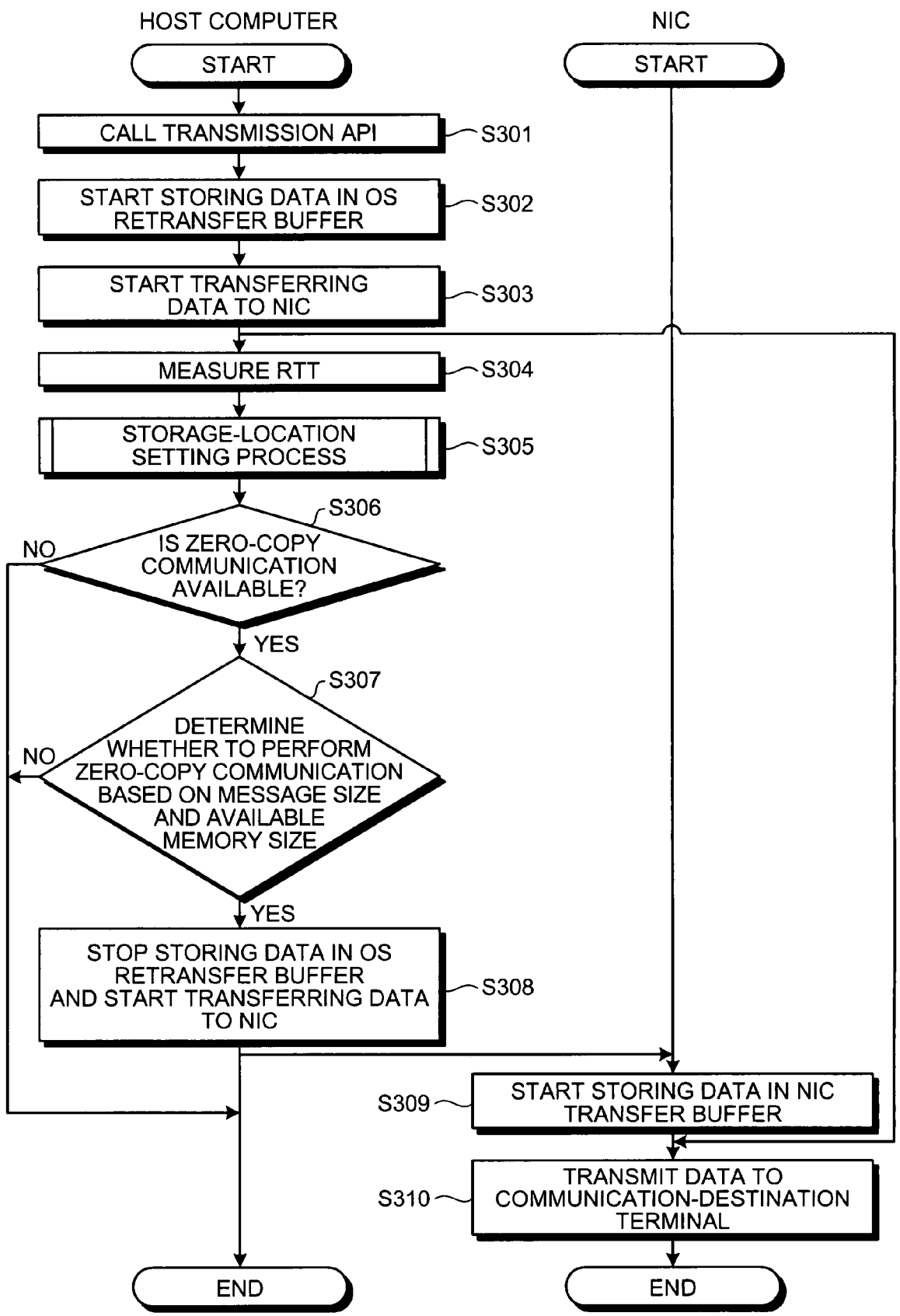
FIG. 8 is a sequence diagram of a communication process performed by a communication system according to a second embodiment of the present invention.

A communication process performed by a communication system according to a second embodiment of the present invention is explained with reference to a sequence diagram shown in FIG. 8. Configurations of the communication system according to the second embodiment is the same as those of the communication system 1, and therefore, the same components and reference numerals are assigned in the below explanation.

When the application 10b instructs the OS 10c to establish a connection before starting a communication (step S301), the host computer 10 starts the normal communication (steps S201, S303, and S310). In other words, when the retransfer-buffer storing unit 12d starts storing the transmission data in the OS retransfer buffer 13d (step S302), the data transfer unit 12e starts transferring stored transmission data to the NIC 20 (step S303). The data transmitting unit 23b in the NIC 20 transmits transferred transmission data to the communication-destination terminal 40 (step S310).

Thereafter, the RTT measuring unit 12b measures the RTT when the normal communication is performed (step S304). The connection determining unit 12c performs the storage-location setting process using measured RTT, similarly to the first embodiment (step S305, see FIG. 7).

The retransfer-buffer storing unit 12d reads a determination result for each connection from the connection memory unit 13b and checks whether the zero-copy communication is available (step S306). If the RTT for a connection is larger than a predetermined threshold, that is, if the zero copy communication cannot be performed in the connection (NO at step S306), the retransfer-buffer storing unit 12d continues to perform the normal communication. Namely, processes performed at steps S302, S303, and S310 are continued until the processes are completed.

On the other hand, if the RTT for a connection is equal to or smaller than the predetermined threshold, that is, if the zero copy communication can be performed in the connection (YES at step S306), the retransfer-buffer storing unit 12d determines whether to perform the zero-copy communication based on a message size and an available memory size (step S307). If it is determined to perform the normal communication (NO at step S307), the retransfer-buffer storing unit 12d continues the normal communication, similarly to the above.

If it is determined to perform the zero-copy communication (YES at step S307), the data transfer unit 12e stops storing transmission data in the OS retransfer buffer 13d, which has been started at steps S302, S303, and S310, and transfers the transmission data to the NIC 20 (step S308). The retransfer-buffer storing unit 23a in the NIC 20 receives the transmission data from the host computer 10 and starts storing the transmission data in the NIC retransfer buffer 24a (step S309). Thereafter, the data transmitting unit 23b transmits the transmission data to the communication-destination terminal 40 (step S310). Processes for storage, transfer, and transmission are continued until the processes are completed.

As described above, since a response time is measured after a connection is established, it is possible to precisely measure the response time in a timed manner.

According to the second embodiment, the storage location for the transmission data is set based on the RTT. However, the present invention is not thus limited, and it is possible to set the storage location for the transmission data based on the RTT and the retransfer buffer usage.

Figure 9:
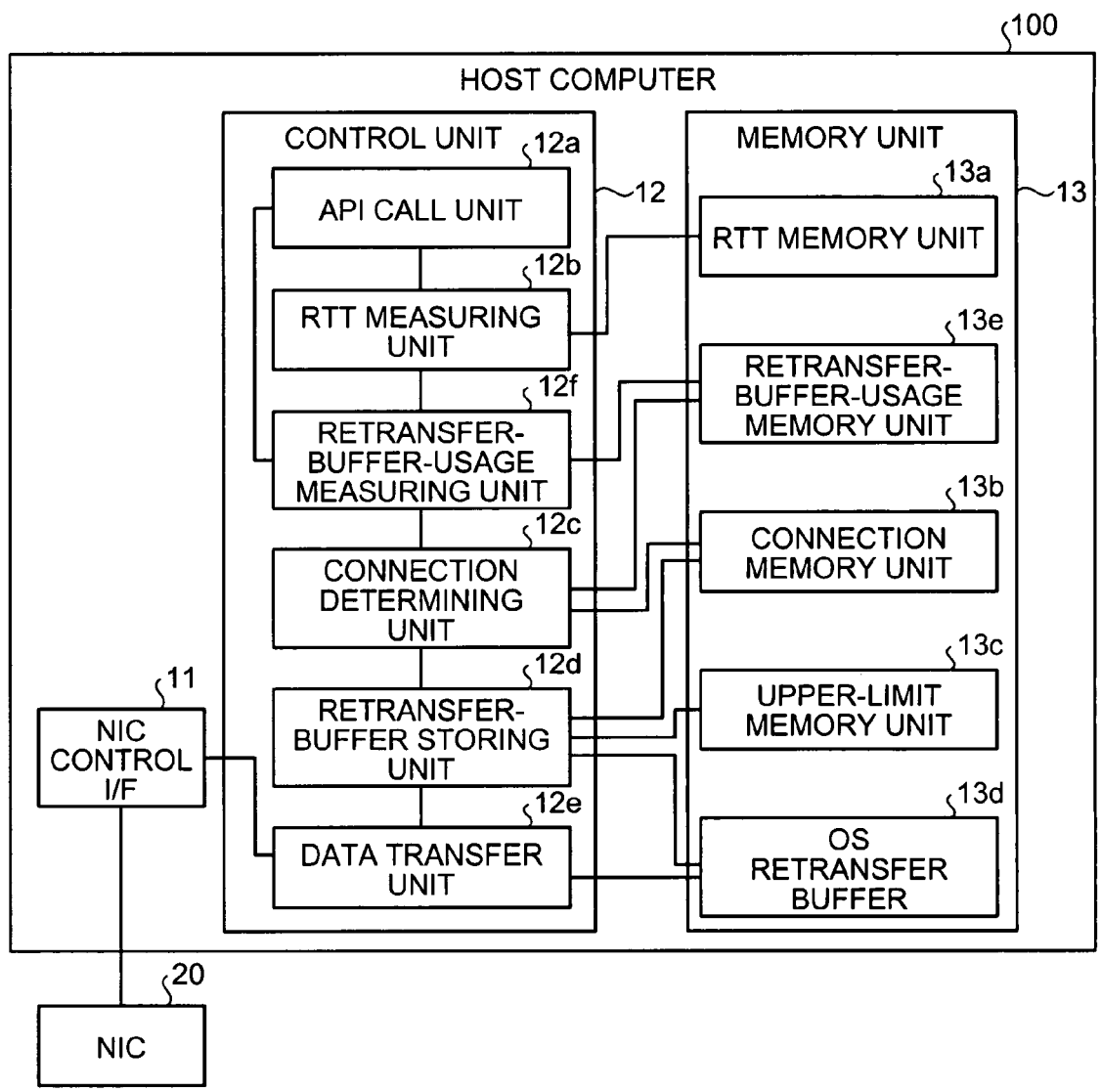
FIG. 9 is a block diagram of a host computer according to a third embodiment of the present invention.
Figures 10, 11:
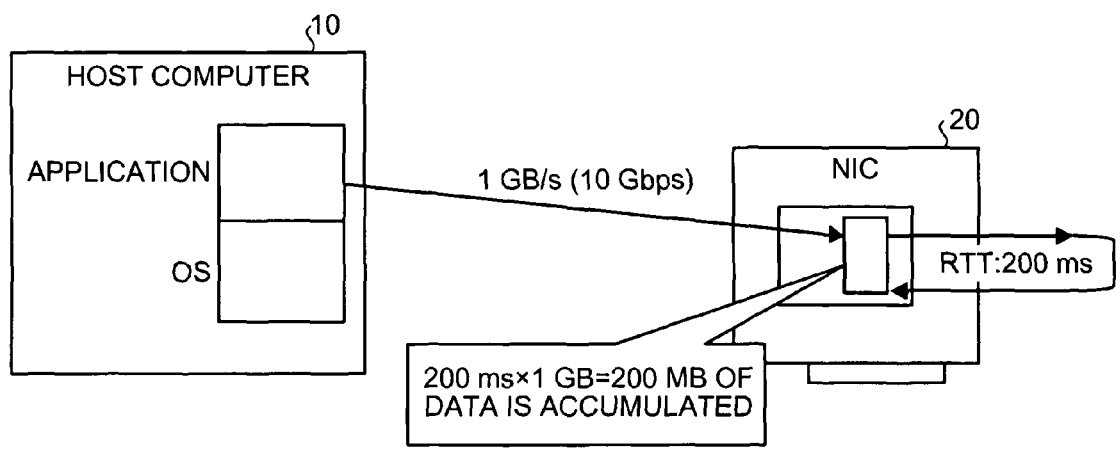
FIG. 10 is a schematic diagram for explaining a retransfer-buffer-usage measurement process performed by a retransfer-buffer-usage measuring unit shown in FIG. 9.
FIG. 11 is a table for explaining a connection determination process performed by a connection determining unit shown in FIG. 9.
Figure 12:
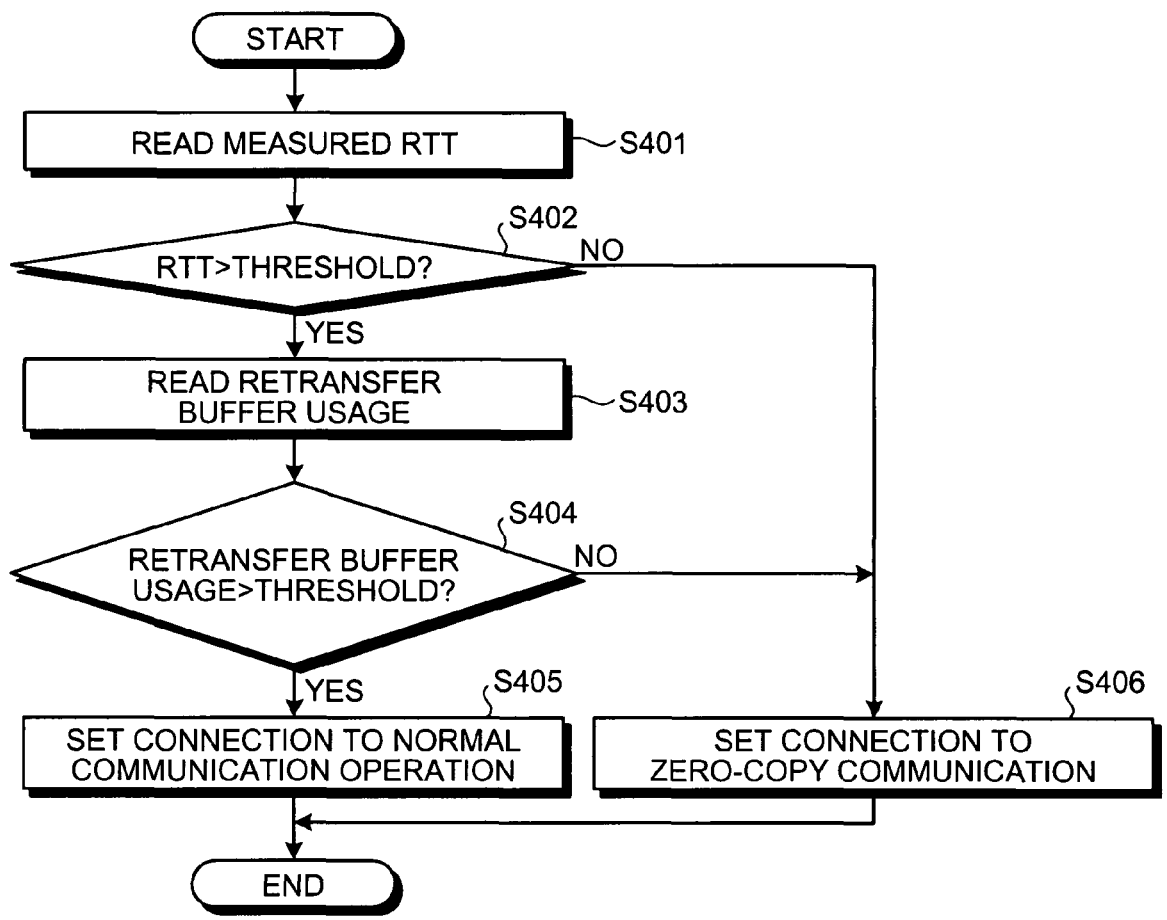
FIG. 12 is a flowchart of a storage-location setting process performed by the host computer shown in FIG. 9.

A case in which the storage location for the transmission data is set based not only on the RTT but also on the retransfer buffer usage is explained below in a third embodiment of the present invention. FIG. 9 is a block diagram of a host computer 100 according to the third embodiment. FIG. 10 is a schematic diagram for explaining a measurement of a retransfer buffer usage. FIG. 11 is a table for explaining a connection determination process performed by the connection determining unit 12c. FIG. 12 is a flowchart of a storage-location setting process performed by the host computer 100.

As shown in FIG. 9, the host computer 100 is different from the host computer 10 shown in FIG. 2 in that the control unit 12 further includes a retransfer-buffer-usage measuring unit 12f and the memory unit 13 further includes a retransfer-buffer-usage memory unit 13e.

In the host computer 100, the retransfer-buffer-usage memory unit 13e stores therein a retransfer buffer usage. Specifically, the retransfer-buffer-usage memory unit 13e stores therein the retransfer buffer usage measured by the retransfer-buffer-usage measuring unit 12f.

The retransfer-buffer-usage measuring unit 12f measures the retransfer buffer usage for the transmission data for each connection. Specifically, the retransfer-buffer-usage measuring unit 12f calculates a value by multiplying a communication speed by the RTT to measure the retransfer buffer usage and stores a measurement result in the retransfer-buffer-usage memory unit 13e.

A process for measuring the retransfer buffer usage is explained with reference to FIG. 10. For example, if a communication speed is 1 GB/s (10 Gbps) and the RTT of a reception acknowledgement is 200 ms in a connection, the retransfer-buffer-usage measuring unit 12f measures a product of the both values, that is, 200 MB is obtained by multiplying 200 ms by 1 GB, as the retransfer buffer usage.

The connection determining unit 12c determines whether the RTT is larger than a predetermined threshold, and further determines whether the retransfer buffer usage is equal to or smaller than the predetermined threshold among connections which RTTs have been determined to be larger than the threshold. Specifically, the connection determining unit 12c reads the RTT for each connection from the RTT memory unit 13a, and determines whether read RTT for each connection is larger than the predetermined threshold. Upon determining that the RTT is larger than the predetermined threshold, the connection determining unit 12c reads the retransfer buffer usage for each connection from the retransfer-buffer-usage memory unit 13e, and determines whether read retransfer buffer usage is larger than the predetermined threshold.

If the retransfer buffer usage is larger than the predetermined threshold, the connection determining unit 12c stores a determination result in the connection memory unit 13b, and sets the normal communication to the connection. If the retransfer buffer usage is equal to or smaller than the predetermined threshold, the connection determining unit 12c stores a determination result in the connection memory unit 13*b*, and sets the zero-copy communication operation to the connection.

A connection determination process is explained with reference to FIG. 11. It is explained with examples of four communications represented by cases A to D. In the case A, the bandwidth is 10 Gbps and the RTT is 1 ms, in the case B the bandwidth is 10 Gbps and the RTT is 200 ms, in the case C the bandwidth is 100 Mbps and the RTT is 1 ms, and in the case D the bandwidth is 100 Mbps and the RTT is 200 ms. A retransfer buffer usage (BT product obtained by multiplying the bandwidth by the RTT) per connection for each of the four communications is listed on the fourth row of the example shown in FIG. 11. A total retransfer buffer usage for all connections in each of the four communications is obtained under assumption that the total number of connections in each communication corresponds to the necessary number for using up physical bandwidth of 10 Gbps, and listed on the fifth low of the example shown in FIG. 11.

The cases A and C are targeted for performing the zero-copy communication because of the small RTTs. Such communications with the small RTT is made between clusters or between blades in a blade server.

In the case B, since the connection requires a large RTT and a large retransfer buffer usage, the connection is excluded from a target for performing the zero-copy communication. In the case D, since the connection requires a large RTT and a small retransfer buffer usage (BT product), the connection is targeted for performing the zero-copy communication. However, if there are number of connections in the case D, the connections are targeted for performing the zero-copy communication as long as the NIC retransfer buffer 24*a* has an available space. In this case, if the capacity of the NIC retransfer buffer 24*a* becomes full, new connections are targeted for performing the normal communication.

A storage-location setting process according to the third embodiment is explained below with reference to FIG. 12. The communication is performed similarly to that shown in FIG. 8, and therefore detailed explanation will be omitted. The storage-location setting process according to the third embodiment is different from that shown in FIG. 7 in that a process for determining whether a retransfer buffer usage is larger than a threshold is added after a process for determining whether the RTT is larger than a threshold.

As shown in FIG. 12, the RTT measuring unit 12*b* reads the RTT for each connection from the RTT memory unit 13*a* (step S401). If it is determined that read RTT is larger than a predetermined threshold (YES at step S402), the connection determining unit 12*c* reads a retransfer buffer usage for each connection from the retransfer-buffer-usage memory unit 13*e* (step S403), and determines whether read retransfer buffer usage is larger than a predetermined threshold (step S404).

If it is determined that the retransfer buffer usage is larger than the predetermined threshold (YES at step S404), the connection determining unit 12*c* stores a determination result in the connection memory unit 13*b* and sets the normal communication to the connection (step S405). If it is determined that the retransfer buffer usage is equal to or smaller than the predetermined threshold (NO at step S404), the connection determining unit 12*c* stores a determination result in the connection memory unit 13*b* and sets the zero-copy communication operation to the connection (step S406).

As described above, a retransfer buffer usage used for the transmission data is measured for each connection, and when it is determined that the response time of a connection is larger than a predetermined RTT threshold, it is determined whether measured retransfer buffer usage for the connection is equal to or smaller than a predetermined usage threshold. If it is determined that the response time is larger than the predetermined RTT threshold, but the retransfer buffer usage is determined to be equal to or smaller than the predetermined usage threshold, the transmission data for the connection is stored in the NIC retransfer buffer 24*a*. Accordingly, for a connection in which a long response time and a small retransfer buffer usage are required, that is, if the communication speed can effectively be increased in the connection by storing the transmission data in the NIC retransfer buffer 24*a*, the transmission data is stored in the NIC retransfer buffer 24*a*. Therefore, it is possible to increase a communication speed.

According to the present invention, it is possible to switch a storage location for storing the transmission data after starting transfer and storage of the transmission data.

Figure 13:
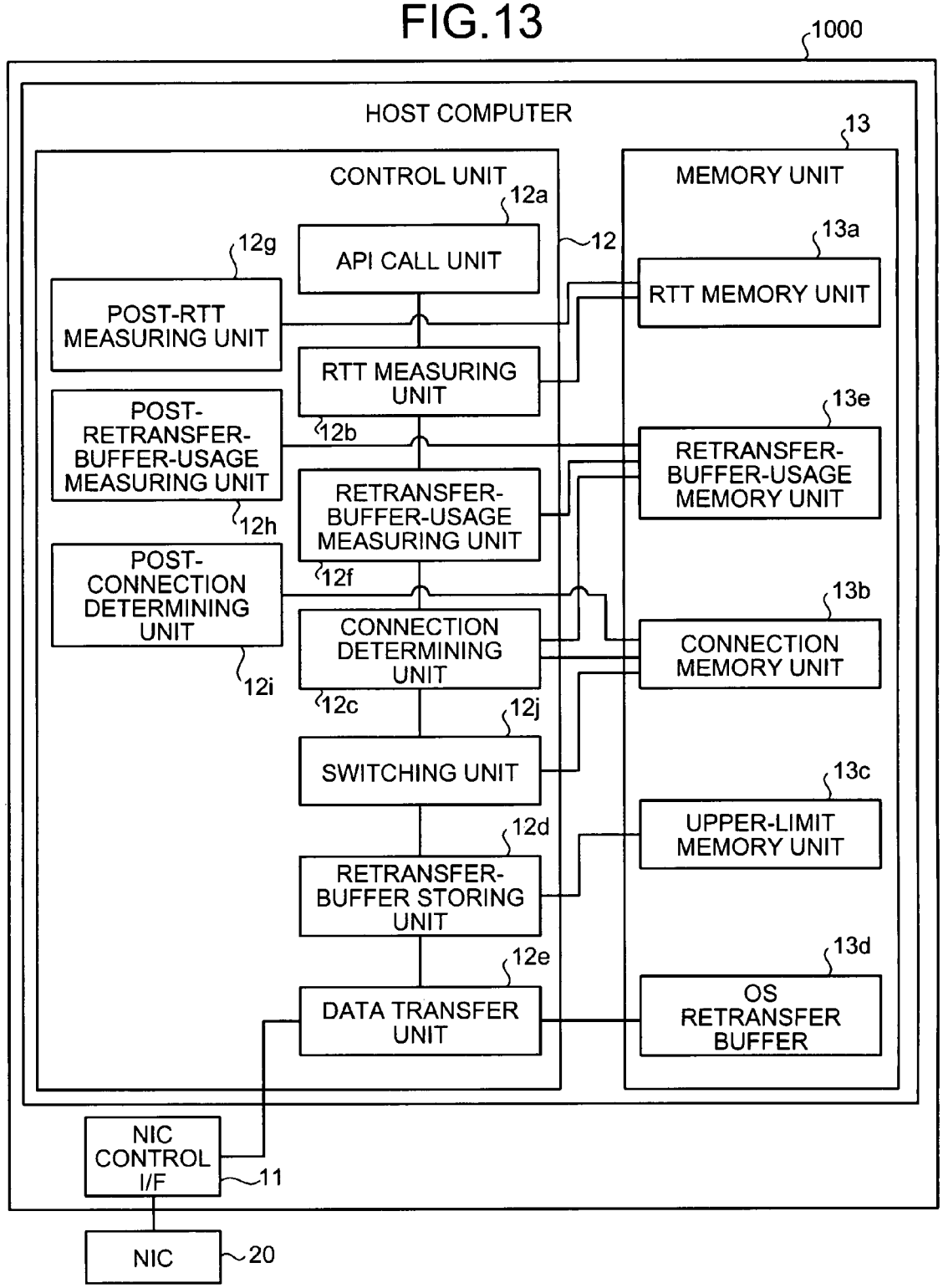
FIG. 13 is a block diagram of a host computer according to a fourth embodiment of the present invention.
Figure 14:
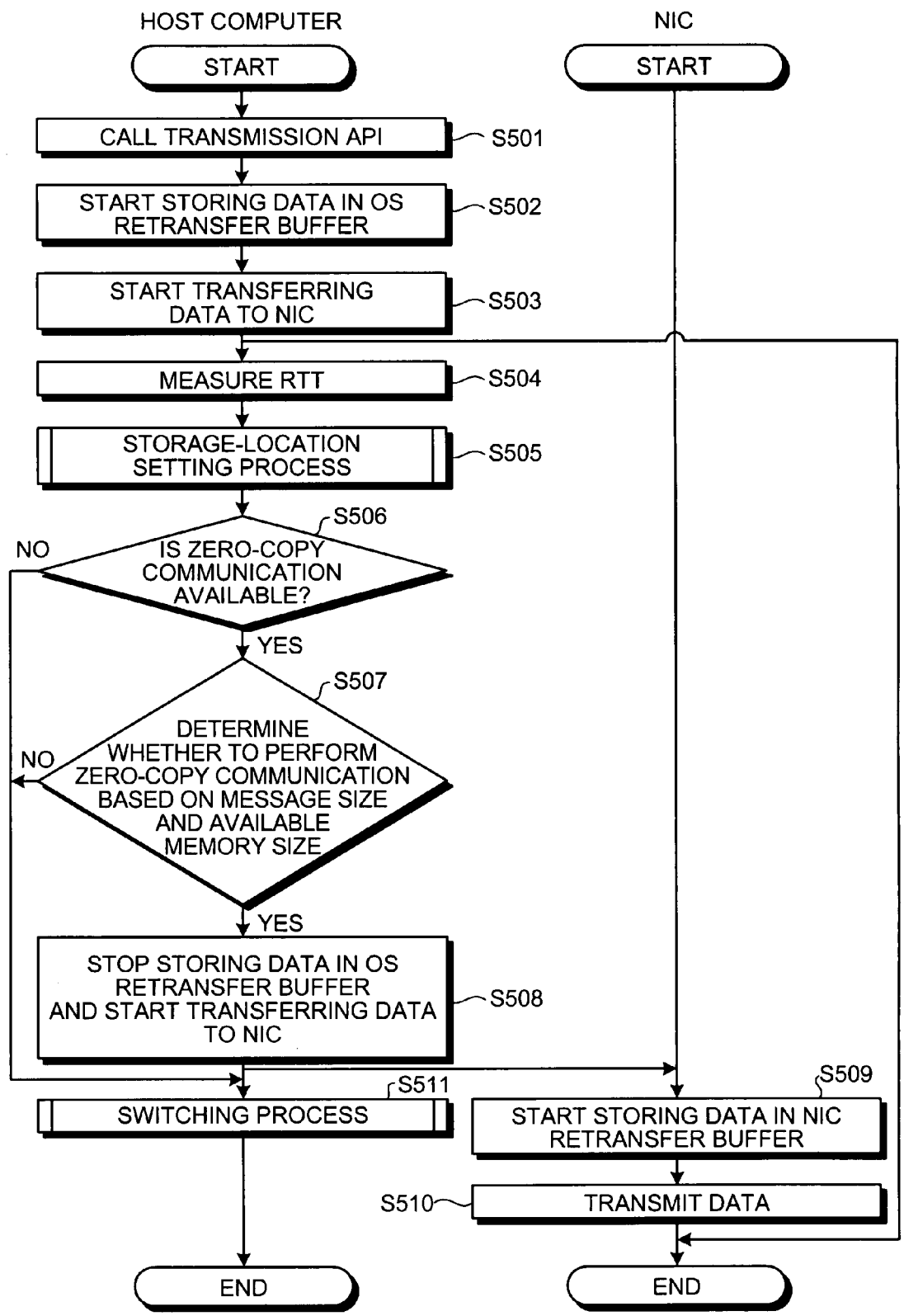
FIG. 14 is a sequence diagram of a communication process performed by a communication system according to the fourth embodiment.
Figure 15:
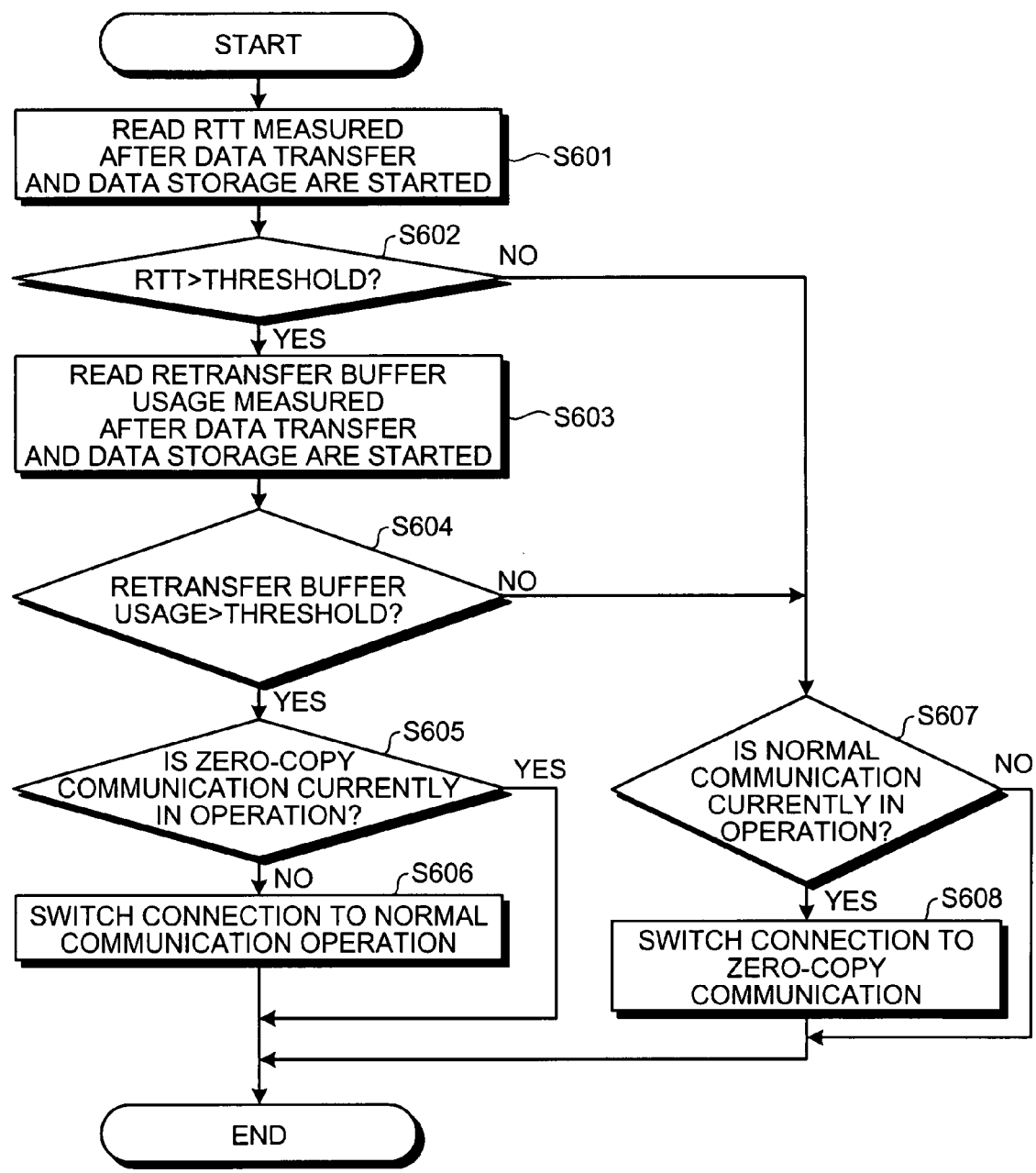
FIG. 15 is a flowchart of a switching process performed by the host computer shown in FIG. 13.

A case in which a storage location for storing the transmission data is switched after starting the transfer and the storage of the transmission data is explained in a fourth embodiment of the present invention. FIG. 13 is a block diagram of a host computer 1000 according to the fourth embodiment. FIG. 14 is a sequence diagram of a communication process performed by the host computer 1000. FIG. 15 is a flowchart of a switching process performed by the host computer 1000.

As shown in FIG. 13, the host computer 1000 is different from the host computer 100 shown in FIG. 9 in that the control unit 12 includes a post-RTT measuring unit 12*g*, a post-retransfer-buffer-usage measuring unit 12*h*, a post-connection determining unit 12*i*, and a switching unit 12*j*.

The post-RTT measuring unit 12*g* measures the RTT for each connection after starting the transfer and the storage of the transmission data. Specifically, the post-RTT measuring unit 12*g* measures the RTT after starting the data transfer and the data storage and stores measured post-RTT in the RTT memory unit 13*a*.

The post-retransfer-buffer-usage measuring unit 12*h* measures the retransfer buffer usage for each connection after starting the transfer and the storage of the transmission data. Specifically, the post-retransfer-buffer-usage measuring unit 12*h* measures the retransfer buffer usage after starting the transfer and the storage of the transmission data and stores measured retransfer buffer usage in the retransfer-buffer-usage memory unit 13*e*.

The post-connection determining unit 12*i* determines whether the RTT and the retransfer buffer usage obtained after starting the transfer and the storage of the transmission data are larger than each of predetermined thresholds. Specifically, the post-connection determining unit 12*i* reads the RTT measured by the post-RTT measuring unit 12*g* after starting the data transfer and the data storage and determines whether read RTT is larger than a predetermined threshold.

If it is determined that the RTT measured after the data transfer and the data storage is larger than the predetermined threshold, the post-connection determining unit 12*i* reads the retransfer buffer usage measured by the post-retransfer-buffer-usage measuring unit 12*h* after the data transfer and the data storage, and determines whether read retransfer buffer usage is equal to or smaller than the a predetermined threshold.

The switching unit 12*j* switches the storage location for storing the transmission data therein for each connection. Specifically, if the post-connection determining unit 12*i* determines that the RTT measured after the data transfer and the data storage is equal to or smaller than the predetermined threshold, the switching unit 12*j* determines whether the normal communication is currently in operation. If the normal communication is currently in operation, the switching unit 12*j* switches the connection to the zero-copy communication.

If the normal communication is not currently in operation, the switching unit 12*j* does not switch the connection and terminates the process.

If the post-connection determining unit 12*i* determines that the retransfer buffer usage measured after starting the data transfer and the data storage is equal to or smaller than the predetermined threshold, the switching unit 12*j* determines whether the normal communication is currently in operation. If it is determined that the normal communication is currently in operation, the switching unit 12*j* switches the connection to the zero-copy communication. If the normal communication is not currently in operation, the switching unit 12*j* does not switch the connection and terminates the process.

A communication process performed by a communication system according to the fourth embodiment is explained below with reference to FIG. 14. The communication process shown in FIG. 14 is different from that shown in FIG. 8 in that a process for switching storage location for storing the transmission data therein after starting data transfer and data storage is added.

As shown in FIG. 14, the host computer 10 starts transfer and storage of the transmission data (steps S501 to S510), and switches a storage location for storing the transmission data therein (step S511).

A switching process is explained in detail with reference to FIG. 15. The post-connection determining unit 12*i* reads the RTT measured by the post-RTT measuring unit 12*g* after the data storage and the data transfer (step S601), and determines whether read RTT is larger than a predetermined threshold (step S602). If the post-connection determining unit 12*i* determines that the read RTT is equal to or smaller than the predetermined threshold (NO at step S602), the switching unit 12*j* determines whether the normal communication is currently in operation (step S607). If the normal operation is currently in operation (YES at step S607), the switching unit 12*j* switches the connection to the zero-copy communication. If the normal operation is not currently in operation (NO at step S607), the switching unit 12*j* does not switch the connection and terminates the process.

On the other hand, if the post-connection determining unit 12*i* determines that the read RTT is larger than the predetermined threshold (YES at step S602), the post-connection determining unit 12*i* reads the retransfer buffer usage measured after the data transfer and the data storage (step S603) and determines whether measured retransfer buffer usage is larger than the predetermined threshold (step S604). If the post-connection determining unit 12*i* determines that the measured retransfer buffer usage is equal to or smaller than the predetermined threshold (NO at step S604), the switching unit 12*j* determines whether the normal communication is currently in operation (step S607). If the normal communication is currently in operation (YES at step S607), the switching unit 12*j* switches the connection to the zero-copy communication (step S608). If the normal communication is not currently in operation (NO at step S607), the switching unit 12*j* does not switch the connection and terminates the process.

If the post-connection determining unit 12*i* determines that the measured retransfer buffer usage is larger than the predetermined threshold (YES at step S604), the switching unit 12*j* determines whether the zero-copy communication is currently in operation (step S605). If the zero-copy communication is currently in operation (YES at step S605), the switching unit 12*j* switches the connection to the normal communication (step S606). If the zero-copy communication is not currently in operation (NO at step S605), the switching unit 12*j* does not switch the connection and terminates the process.

As described above, after starting the transfer and the storage of the transmission data, a response time is measured, and measured response time is determined whether the response time is larger than a predetermined RTT threshold. Thereafter, if it is determined that the measured response time for the connection, in which it is started to store the transmission data in the OS retransfer buffer 13*d*, is equal to or smaller than the predetermined RTT threshold, the storage location for the connection is changed to the NIC retransfer buffer 24*a*. On the other hand, if it is determined that the measured response time for the connection, in which it is started to store the transmission data in the NIC retransfer buffer 24*a*, is larger than the predetermined RTT threshold, the storage location is changed to the OS retransfer buffer 13*d*. Accordingly, if the connection in which the transmission data is being stored in the NIC retransfer buffer 24*a* requires an increased response time, the storage location is changed to the OS retransfer buffer 13*d*. Therefore, it is possible to suppress memory usage in the NIC 20.

Furthermore, after starting the transfer and the storage of the transmission data, the retransfer buffer usage is measured, and measured retransfer buffer usage is determined whether the retransfer buffer usage is equal to or smaller than a predetermined threshold, for the connection which response time has been determined to be longer than the predetermined RTT threshold. In addition, the storage location is changed to the NIC retransfer buffer 24*a* for the transmission data in the connection that has been determined to require a longer response time than the predetermined threshold and to require the retransfer buffer usage equal to or smaller than the predetermined threshold after the data transfer and the data storage, among connections in which the transmission data is being stored in the OS retransfer buffer 13*d*. Accordingly, if the connection in which the transmission data is being stored in the NIC retransfer buffer 24*a* requires a large retransfer buffer usage, the storage location for storing the transmission data therein is changed to the OS retransfer buffer 13*d*. Therefore, it is possible to suppress memory usage in the NIC 20.

According to the present invention, it is possible not to switch the storage location for a connection which communication has been changed from the zero-copy communication to the normal communication.

Figure 16:
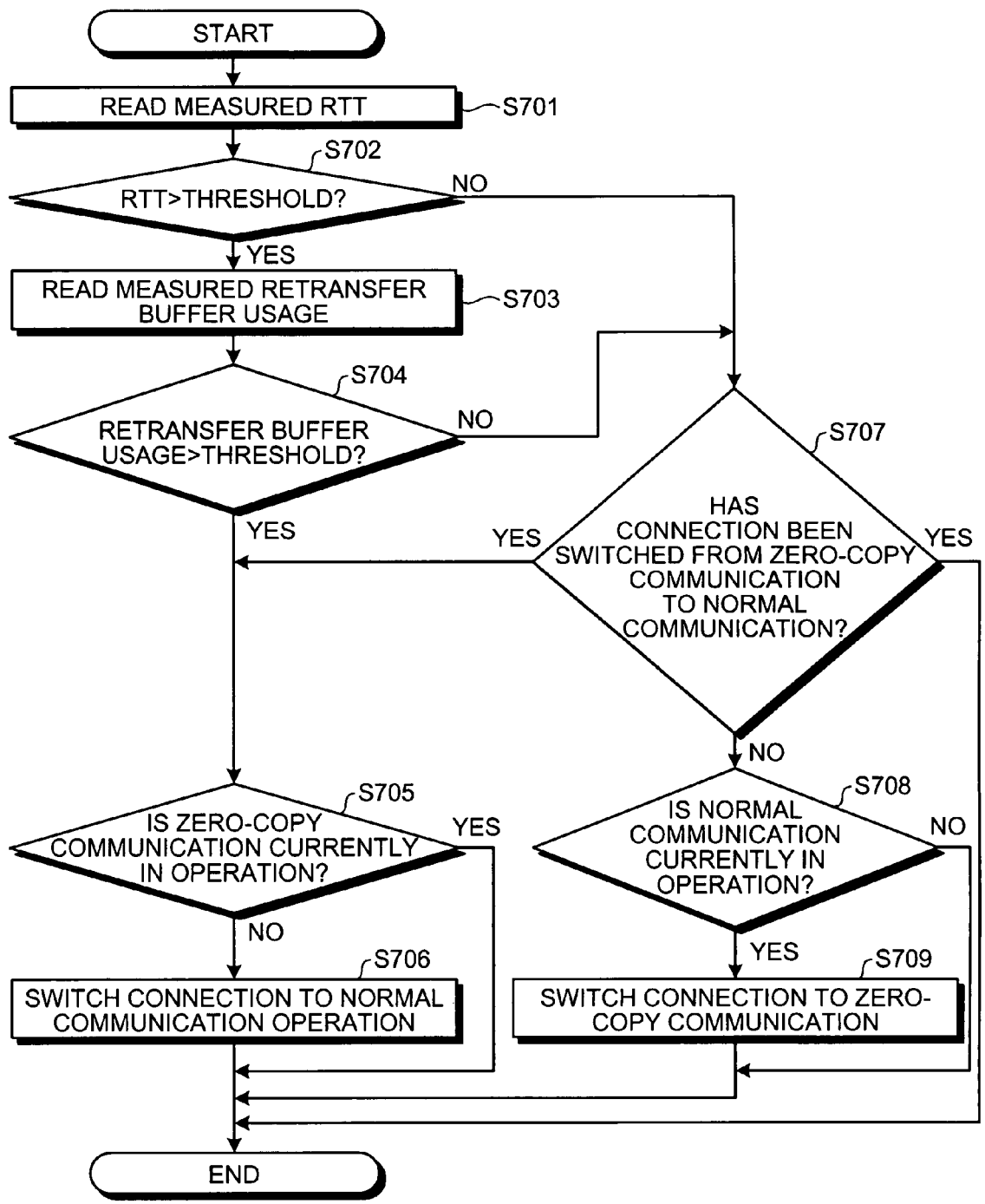
FIG. 16 is a flowchart of a switching process performed by a host computer according to a fifth embodiment of the present invention.

A case in which the storage location is not switched for a connection which communication has been changed from the zero-copy communication to the normal communication is explained in a fifth embodiment of the present invention. FIG. 16 is a flowchart of a switching process performed by a host computer according to the fifth embodiment.

The communication process according to the fifth embodiment is different from that shown in FIG. 15 in that the storage location for storing the transmission data therein is not switched for a connection which communication has been changed from the zero-copy communication to the normal communication.

If the post-connection determining unit 12*i* determines that the RTT measured after the data transfer and the data storage is equal to or smaller than a predetermined threshold (NO at step S702), or if the post-connection determining unit 12*i* determines that the retransfer buffer usage measured after the data transfer and the data storage is equal to or smaller than a predetermined threshold (NO at step S704), the switching unit determines whether the connection has been switched from the zero-copy communication to the normal communication (step S707). If the connection has not been switched from the zero-copy communication to the normal communication (NO at step S707), the switching unit 12j determines whether the normal communication is currently in operation (step S708). If the normal communication is currently in operation (YES at step S708), the switching unit 12j switches the connection to the zero-copy communication (step S709). If the normal communication is not currently in operation (NO at step S708), the switching unit 12j does not switches the connection and terminates the process.

If the connection has been switched from the zero-copy communication to the normal communication (YES at step S707), the switching unit 12j does not switches the connection and terminates the process.

As described above, the storage location is switched for connections other than a connection in which data storage of the transmission data in the NIC retransfer buffer 24a is terminated and the transmission data is stored in the OS retransfer buffer 13d. Therefore, it is possible to properly control a timing of switching the storage location and keep a system operation stable even when the retransfer buffer needs to be frequently switched.

Although the first to the fifth embodiments are explained above, the present invention is not thus limited and various modifications can be made. The modifications are explained below in a sixth embodiment of the present invention.

According to the first to the fifth embodiments, a connection is switched from the normal communication to the zero-copy communication or from the zero-copy communication to the normal communication, using the same predetermined threshold. According to the sixth embodiment, however, it is possible to use a different threshold for each of switching from the normal communication to the zero-copy communication or from the zero-copy communication to the normal communication.

Specifically, in the switching process shown in FIG. 15, after reading the retransfer buffer usage measured by the post-retransfer-buffer-usage measuring unit 12h after the data transfer and the data storage (see step S603 in FIG. 15), the post-connection determining unit 12i determines whether the zero-copy communication is performed or the normal communication is performed for the connection. As a result of determination, if the zero-copy communication is performed, the post-connection determining unit 12i determines whether the retransfer buffer after the data transfer and the data storage is larger than a threshold that is larger than another threshold used in the normal communication (see step S604 in FIG. 15).

In this manner, switching condition for switching the storage location can be differently set for the connection in which the transmission data is stored in the OS retransfer buffer 13d and for the connection in which the transmission data is stored in the NIC retransfer buffer 24a, and the storage location can be switched based on the different switching conditions. Accordingly, thresholds are differently set for a switching to store the transmission data in the OS retransfer buffer 13d and for a switching to store the transmission data in the NIC retransfer buffer 24a. Therefore, it is possible to properly control a timing of the switching and keep a system operation stable even when the communication speed increases, the retransfer buffer usage also increases for storing the transmission data in the NIC retransfer buffer 24a, and the storage location needs to be frequently switched.

Furthermore, it is possible to set different upper-limits for data capacity of the retransfer buffer for the connection performing the normal communication and for the connection performing the zero-copy communication.

Specifically, when the retransfer-buffer storing unit 12d determines whether to perform the zero-copy communication based on a message size and an available memory size (see step S104 in FIG. 6), the retransfer-buffer storing unit 12d determines whether the zero-copy communication is available based on a determination on the RTT, or on the retransfer buffer usage. As a result of the determination, if the zero-copy communication is available based on the retransfer buffer usage, the retransfer-buffer storing unit 12d determines to perform the zero-copy communication using an upper-limit smaller than that used when the zero-copy communication is available based on the RTT.

With this scheme, different upper-limits of the retransfer buffer usage are set for the connection in which the RTT is larger than a predetermined RTT threshold and for the connection in which the retransfer buffer usage is larger than a predetermined usage threshold. Accordingly, for the connection in which the zero-copy communication is made available based on the RTT, the NIC retransfer buffer 24a can constantly have a free space corresponding to an amount obtained by subtracting the retransfer buffer usage obtained in the connection in which the zero-copy communication is made available based on the retransfer buffer usage from the upper-limit of the NIC retransfer buffer 24a. As a result, even if the connection in which the zero-copy communication is made available based on the RTT performs a communication at a maxim communication speed, it is possible to perform the zero-copy communication for a new connection.

Figure 17:
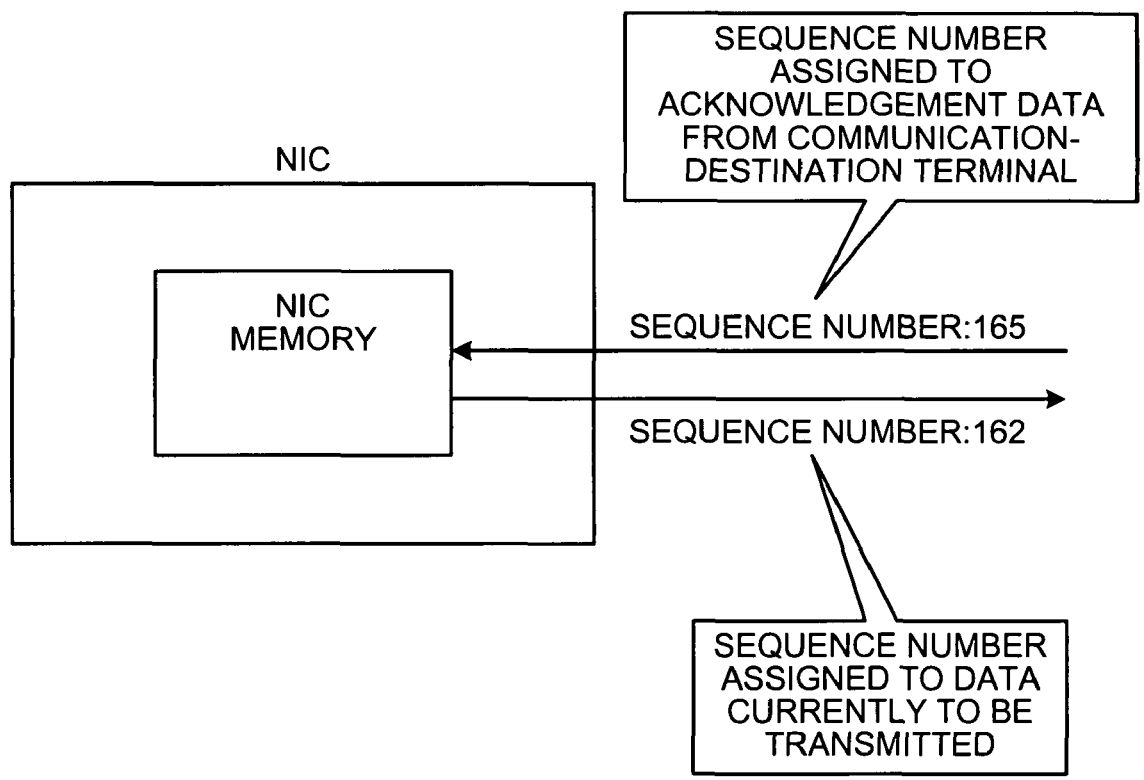
FIG. 17 is a schematic diagram for explaining a measurement of a retransfer buffer usage using a sequence number according to a sixth embodiment of the present invention.

Moreover, the retransfer buffer usage can be measured not only by multiplying a communication speed by the RTT, but also by using a transmission sequence number and an acknowledgement sequence number. Specifically, as shown in FIG. 17, the retransfer buffer usage is measured by subtracting a sequence number (i.e., "162" in FIG. 17) assigned to data currently to be transmitted from a sequence number (i.e., "165" in FIG. 17) assigned to acknowledgement data transmitted from a communication-destination terminal.

In this manner, the retransfer buffer usage is measured based on a value obtained by subtracting the sequence number assigned to the data currently to be transmitted from the sequence number assigned to the acknowledgement data transmitted from a communication-destination terminal. Accordingly, it is possible to precisely measure the retransfer buffer usage using the sequence number.

Furthermore, the communication system 1 according to the first to the fifth embodiments employs a copy offload engine (COE) method. However, a TCP/IP offload engine (TOE) method can be applied to the communication system 1. In other words, a protocol processing for the transmission data is performed not by the OS in the host computer 10 but by the NIC 20.

The constituent elements of apparatuses shown in the drawings are functionally conceptual, and need not be physically configured as illustrated. The specific mode in which the constituent elements are distributed and integrated is not limited to the ones shown in the drawings. A part or all of the apparatuses can be distributed or integrated, either functionally or physically in any arbitrary units according to various loads and use condition. For example, the API call unit 12a and the RTT measuring unit 12b can be integrated. Furthermore, the data transfer unit 12e can be provided both in the host computer 10 and the NIC 20 and the data transfer unit 12e in the NIC 20 can be realized by hardware. A part or all of the processing functions offered by the constituent elements can be realized by a central processing unit (CPU) and a program analyzed and executed by the CPU, or can be realized as hardware with wired logic.

As described above, according to one aspect of the present invention, the communication system measures a response time between either the host computer or the NIC and the communication-destination terminal for each connection, and determines whether measured response time is larger than a predetermined RTT threshold. If it is determined that the response time is larger than the predetermined RTT threshold, the communication system 1 stores the transmission data in the OS retransfer buffer in the host memory. Alternatively, if it is determined that the response time is equal to or smaller than the predetermined RTT threshold, the communication system 1 stores the transmission data in the NIC retransfer buffer. Accordingly, in such a connection that requires a long response time, that is, if the communication speed cannot effectively be increased in the connection by storing the transmission data in the NIC retransfer buffer, the transmission data is stored in the OS retransfer buffer to suppress memory usage in network hardware. On the other hand, in such a connection that does not require a long response time, that is, if the communication speed can effectively be increased in the connection by storing the transmission data in the NIC retransfer buffer, the transmission data is stored in the NIC retransfer buffer. Therefore, it is possible to suppress the memory usage in the network hardware and to increase the communication speed.

Furthermore, according to another aspect of the present invention, a retransfer buffer usage used for the transmission data is measured for each connection, and when it is determined that the response time of a connection is larger than a predetermined RTT threshold, it is determined whether measured retransfer buffer usage for the connection is equal to or smaller than a predetermined usage threshold. If it is determined that the response time is larger than the predetermined RTT threshold, but the retransfer buffer usage is determined to be equal to or smaller than the predetermined usage threshold, the transmission data for the connection is stored in the NIC retransfer buffer. Accordingly, for a connection in which a long response time and a small retransfer buffer usage are required, that is, if the communication speed can effectively be increased in the connection by storing the transmission data in the NIC retransfer buffer, the transmission data is stored in the NIC retransfer buffer. Therefore, it is possible to increase a communication speed.

Moreover, according to still another aspect of the present invention, the retransfer buffer usage is measured based on a value obtained by subtracting the sequence number assigned to the data currently to be transmitted from the sequence number assigned to the acknowledgement data transmitted from a communication-destination terminal. Accordingly, it is possible to precisely measure the retransfer buffer usage using the sequence number.

Furthermore, according to still another aspect of the present invention, after starting the transfer and the storage of the transmission data, a response time is measured, and measured response time is determined whether the response time is larger than a predetermined RTT threshold. Thereafter, if it is determined that the measured response time for the connection, in which it is started to store the transmission data in the OS retransfer buffer, is equal to or smaller than the predetermined RTT threshold, the storage location for the connection is changed to the NIC retransfer buffer. On the other hand, if it is determined that the measured response time for the connection, in which it is started to store the transmission data in the NIC retransfer buffer, is larger than the predetermined RTT threshold, the storage location is changed to the OS retransfer buffer. Accordingly, if the connection in which the transmission data is being stored in the NIC retransfer buffer requires an increased response time, the storage location is changed to the OS retransfer buffer. Therefore, it is possible to suppress memory usage in the NIC.

Moreover, according to still another aspect of the present invention, after starting the transfer and the storage of the transmission data, the retransfer buffer usage is measured, and measured retransfer buffer usage is determined whether the retransfer buffer usage is equal to or smaller than a predetermined threshold, for the connection which response time has been determined to be longer than the predetermined RTT threshold. In addition, the storage location is changed to the NIC retransfer buffer for the transmission data in the connection that has been determined to require a longer response time than the predetermined threshold and to require the retransfer buffer usage equal to or smaller than the predetermined threshold after the data transfer and the data storage, among connections in which the transmission data is being stored in the OS retransfer buffer. Accordingly, if the connection in which the transmission data is being stored in the NIC retransfer buffer requires a large retransfer buffer usage, the storage location for storing the transmission data therein is changed to the OS retransfer buffer. Therefore, it is possible to suppress memory usage in the NIC.

Furthermore, according to still another aspect of the present invention, switching condition for switching the storage location can be differently set for the connection in which the transmission data is stored in the OS retransfer buffer and for the connection in which the transmission data is stored in the NIC retransfer buffer, and the storage location can be switched based on the different switching conditions. Accordingly, thresholds are differently set for a switching to store the transmission data in the OS retransfer buffer and for a switching to store the transmission data in the NIC retransfer buffer. Therefore, it is possible to properly control a timing of the switching and keep a system operation stable even when the communication speed increases, the retransfer buffer usage also increases for storing the transmission data in the NIC retransfer buffer, and the storage location needs to be frequently switched.

Moreover, according to still another aspect of the present invention, the storage location is switched for connections other than a connection in which data storage of the transmission data in the NIC retransfer buffer is terminated and the transmission data is stored in the OS retransfer buffer. Therefore, it is possible to properly control a timing of switching the storage location and keep a system operation stable even when the retransfer buffer needs to be frequently switched.

Furthermore, according to still another aspect of the present invention, since the response time is measured at a timing of the establishment of each connection, it is possible to easily and precisely measure the response time, based on data transmission/reception to/from the communication-destination terminal 40 at a timing of handshake.

Moreover, according to still another aspect of the present invention, since a response time is measured after a connection is established, it is possible to precisely measure the response time in a timed manner.

Furthermore, according to still another aspect of the present invention, an upper-limit that indicates data capacity available for storing data in the NIC retransfer buffer 24a is set. The transmission data is stored in the NIC retransfer buffer 24a when the available memory size of the NIC retransfer buffer 24a is equal to or larger than a size obtained by subtracting a size of the NIC retransfer buffer 24a currently being used in the NIC 20 from set upper-limit. Therefore, it is possible to arbitrarily set memory usage in the NIC 20.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable, non-transitory medium that stores therein a computer program for transferring transmission data from a host memory that includes a first retransfer buffer for storing therein the transmission data to a network hardware that includes a second retransfer buffer for storing therein the transmission data and transmitting the transmission data to a destination terminal via a connection that is a virtual communication path established on either one of a host computer and the network hardware, the computer program causing a computer to execute:

measuring a response time from the destination terminal;
determining whether measured response time is larger than a first delay threshold;
first storing including, when it is determined that the measured response time is larger than the first delay threshold, storing the transmission data in the first retransfer buffer and transferring a copy of the stored transmission data to the network hardware; and
second storing including, when it is determined that the measured response time is smaller than the first delay threshold, transferring the transmission data to the network hardware and storing the transferred transmission data in the second retransfer buffer, wherein
the measuring includes measuring a retransfer buffer usage to be used for a storage of the transmission data for each connection,
the determining includes determining whether measured retransfer buffer usage is smaller than a first usage threshold for a connection in which the measured response time is determined to be larger than the first delay threshold, and
when it is determined that the measured response time is larger than the first delay threshold and when it is determined that the retransfer buffer usage is smaller than the first usage threshold, the second storing includes storing the transferred transmission data in the second retransfer buffer.

2. The computer-readable, non-transitory medium according to claim 1, wherein the measuring includes measuring the retransfer buffer usage based on a value obtained by subtracting a sequence number of data currently to be transmitted from a sequence number assigned to acknowledgement data from the destination terminal.

3. The computer-readable, non-transitory medium according to claim 1, wherein
the measuring includes measuring the response time after transferring and storing the transmission data is started,
the determining includes determining whether measured response time after the transferring and storing the transmission data is started is larger than a second delay threshold, and
the computer program further causes the computer to execute switching, when it is determined that the measured response time after the transferring and storing the transmission data is started is smaller than the second delay threshold for a first connection in which the storing of the transmission data in the first retransfer buffer is started, a storage location of the transmission data in the first connection to the second retransfer buffer, and when it is determined that the measured response time after the transferring and storing the transmission data is started is larger than the second delay threshold for a second connection in which the storing of the transmission data in the second retransfer buffer is started, a storage location in the second connection to the first retransfer buffer.

4. The computer-readable, non-transitory medium according to claim 3, wherein the switching includes switching the storage location of the transmission data using different switching conditions for a connection in which the transmission data is stored in the first retransfer buffer and for a connection in which the transmission data is stored in the second retransfer buffer.

5. The computer-readable, non-transitory medium according to claim 3, wherein the switching includes switching the storage location of the transmission data in a connection other than a connection in which storing of the transmission data in the second retransfer buffer is stopped so that the transmission data is stored in the first retransfer buffer.

6. The computer-readable, non-transitory medium according to claim 1, wherein the measuring includes measuring the response time at a time of establishing the connection.

7. The computer-readable, non-transitory medium according to claim 1, wherein the measuring includes measuring the first response time after establishing the connection.

8. The computer-readable, non-transitory medium according to claim 1, wherein
the computer program further causes the computer to execute setting an upper-limit of the second retransfer buffer indicating a capacity of the second retransfer buffer available for storing the transmission data, and
the second storing includes storing the transmission data in the second retransfer buffer when there is a residual free space of the second retransfer buffer, the free space of the second retransfer buffer being obtained by subtracting a capacity of the second retransfer buffer currently being used from the upper-limit of the second retransfer buffer.

9. The computer-readable, non-transitory medium according to claim 8, wherein the setting includes setting a value equal to or larger than a value obtained by multiplying a communication speed of the network hardware by the first delay threshold as the upper-limit of the second retransfer buffer.

10. The computer-readable, non-transitory medium according to claim 8, wherein the setting includes setting different upper-limits of the second retransfer buffer for a connection in which the measured response time is determined to be larger than the first delay threshold and for a connection in which the measured retransfer buffer usage is determined to be larger than the first usage threshold.

11. The computer-readable, non-transitory medium according to claim 1, wherein for a connection in which the measured response time is determined to be larger than the first delay threshold, the second storing includes storing the transmission data in the second retransfer buffer when a size of the transmission data is larger than a predetermined size in the connection.

12. The computer-readable, non-transitory medium according to claim 1, wherein for a connection in which the measured response time is determined to be larger than the first delay threshold, the second storing includes storing the transmission data in the second retransfer buffer when a size of the transmission data is larger than a predetermined size in the connection.

13. A computer-readable, non-transitory medium that stores therein a computer program for transferring transmission data from a host memory that includes a first retransfer buffer for storing therein the transmission data to a network hardware that includes a second retransfer buffer for storing therein the transmission data and transmitting the transmission data to a destination terminal via a connection that is a virtual communication path established on either one of a host computer and the network hardware, the computer program causing a computer to execute:

measuring a response time from the destination terminal;
determining whether measured response time is larger than a first delay threshold;
first storing including, when it is determined that the measured response time is larger than the first delay threshold, storing the transmission data in the first retransfer buffer and transferring a copy of the stored transmission data to the network hardware; and
second storing including, when it is determined that the measured response time is smaller than the first delay threshold, transferring the transmission data to the network hardware and storing the transferred transmission data in the second retransfer buffer, wherein
the measuring includes measuring the retransfer buffer usage after transferring and storing the transmission data is started,
the determining includes determining whether measured retransfer buffer usage after the transferring and storing the transmission data is started is smaller than a second usage threshold for a connection in which the measured response time after the transferring and storing the transmission data is started is larger than the second delay threshold, and
the computer program further causes the computer to execute switching, when it is determined that the measured response time after the transferring and storing the transmission data is started is larger than the second delay threshold and when it is determined that the measured retransfer buffer usage after the transferring and storing the transmission data is started is smaller than the second usage threshold for a connection in which the storing of the transmission data in the first retransfer buffer is started, a storage location of the transmission data in the first connection to the second retransfer buffer.

14. The computer-readable, non-transitory medium according to claim 13, wherein the switching includes switching the storage location of the transmission data using different switching conditions for a connection in which the transmission data is stored in the first retransfer buffer and for a connection in which the transmission data is stored in the second retransfer buffer.

15. The computer-readable, non-transitory medium according to claim 13, wherein the switching includes switching the storage location of the transmission data in a connection other than a connection in which storing of the transmission data in the second retransfer buffer is stopped so that the transmission data is stored in the first retransfer buffer.

16. An apparatus for transferring transmission data from a host memory that includes a first retransfer buffer for storing therein the transmission data to a network hardware that includes a second retransfer buffer for storing therein the transmission data and transmitting the transmission data to a destination terminal via a connection that is a virtual communication path established on either one of a host computer and the network hardware, the apparatus comprising:

a controller that measures a response time from the destination terminal,
and determines whether measured response time is larger than a first delay threshold;
a storing unit that stores, when it is determined that the measured response time is larger than the first delay threshold, the transmission data in the first retransfer buffer; and
a transferring unit that
transfers, when it is determined that the measured response time is larger than the first delay threshold, a copy of the stored transmission data to the network hardware, and
transfers, when it is determined that the measured response time is smaller than the first delay threshold, the transmission data to the network hardware and causes the network hardware to store the transferred transmission data in the second retransfer buffer, wherein
the controller further measures a retransfer buffer usage to be used for a storage of the transmission data for each connection,
and further determines whether the measured retransfer buffer usage is smaller than a first usage threshold for a connection in which the measured response time is determined to be larger than the first delay threshold, and
the transferring unit transfers the transmission data to the network hardware, when it is determined that the measured response time is larger than the first delay threshold and the retransfer buffer usage is smaller than the first usage threshold.

17. A method of transferring transmission data from a host memory that includes a first retransfer buffer for storing therein the transmission data to a network hardware that includes a second retransfer buffer for storing therein the transmission data and transmitting the transmission data to a destination terminal via a connection that is a virtual communication path established on either one of a host computer and the network hardware, the method comprising:

measuring a response time from the destination terminal;
determining whether measured response time is larger than a first delay threshold;
first storing including, when it is determined that the measured response time is larger than the first delay threshold, storing the transmission data in the first retransfer buffer and transferring a copy of the stored transmission data to the network hardware; and
second storing including, when it is determined that the measured response time is smaller than the first delay threshold, transferring the transmission data to the network hardware and storing the transferred transmission data in the second retransfer buffer, wherein
the measuring includes measuring a retransfer buffer usage to be used for a storage of the transmission data for each connection,
the determining includes determining whether measured retransfer buffer usage is smaller than a first usage threshold for a connection in which the measured response time is determined to be larger than the first delay threshold, and
when it is determined that the measured response time is larger than the first delay threshold and when it is determined that the retransfer buffer usage is smaller than the first usage threshold, the second storing includes storing the transferred transmission data in the second retransfer buffer.

* * * * *